United States Patent
Cho et al.

(10) Patent No.: US 10,039,039 B2
(45) Date of Patent: Jul. 31, 2018

(54) METHOD AND APPARATUS FOR PERFORMING HANDOVER IN WIRELESS COMMUNICATION SYSTEM

(71) Applicant: LG Electronics Inc., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/896,729

(22) PCT Filed: Jun. 25, 2014

(86) PCT No.: PCT/KR2014/005646
§ 371 (c)(1),
(2) Date: Dec. 8, 2015

(87) PCT Pub. No.: WO2015/002404
PCT Pub. Date: Jan. 8, 2015

(65) Prior Publication Data
US 2016/0142954 A1 May 19, 2016

Related U.S. Application Data

(60) Provisional application No. 61/841,938, filed on Jul. 2, 2013.

(51) Int. Cl.
*H04W 4/00* (2009.01)
*H04W 36/14* (2009.01)
(Continued)

(52) U.S. Cl.
CPC ....... *H04W 36/14* (2013.01); *H04W 36/0066* (2013.01); *H04W 36/36* (2013.01); *H04W 36/30* (2013.01); *H04W 88/06* (2013.01)

(58) Field of Classification Search
CPC ..... H04W 36/14; H04W 36/30; H04W 88/06; H04W 36/0066; H04W 36/36;
(Continued)

(56) References Cited

U.S. PATENT DOCUMENTS 8,199,720 B2   6/2012  Hahn et al.
9,307,437 B2 * 4/2016  Yang .................... H04W 24/10
(Continued)

FOREIGN PATENT DOCUMENTS

EP         2197222 A1      6/2010

*Primary Examiner* — Brenda H Pham
(74) *Attorney, Agent, or Firm* — Dentons US LLP

(57) ABSTRACT

A method for and apparatus for performing handover in a wireless communication system is provided. A wireless device transmits measurement results configured for a secondary radio access technologies (RAT) system, receives information on routing modification based on the measurement results, from a network entity of a primary RAT system and performs a handover to a target access network according to the information on routing modification. The secondary RAT system is used for a user plane (U-plane) data, and the handover is determined based on at least one of a quality of service (QoS) information, load information about the primary RAT system and secondary RAT system, and a network preference information of the UE.

9 Claims, 21 Drawing Sheets

(51) Int. Cl.
*H04W 36/00* (2009.01)
*H04W 36/36* (2009.01)
*H04W 36/30* (2009.01)
*H04W 88/06* (2009.01)

(58) Field of Classification Search
CPC ..... H04W 84/12; H04W 88/08; H04W 80/04; H04W 84/18; H04L 2012/5608
USPC ............ 370/310.2, 328, 331, 332, 349, 338
See application file for complete search history.

(56) References Cited

U.S. PATENT DOCUMENTS

| | | |
|---|---|---|
| 2009/0191862 A1 | 7/2009 | Amirijoo et al. |
| 2011/0310851 A1* | 12/2011 | Klingenbrunn ..... H04W 76/041 370/332 |
| 2012/0014357 A1 | 1/2012 | Jung et al. |
| 2012/0076018 A1* | 3/2012 | Singh ................ H04W 36/0083 370/252 |
| 2012/0263145 A1 | 10/2012 | Marinier et al. |
| 2013/0016696 A1 | 1/2013 | Adjakple et al. |
| 2013/0083783 A1* | 4/2013 | Gupta ............... H04W 28/0215 370/338 |
| 2013/0143568 A1 | 6/2013 | Kapoor et al. |
| 2014/0050086 A1* | 2/2014 | Himayat ............ H04N 21/2365 370/230 |
| 2014/0206353 A1* | 7/2014 | Kim ..................... H04W 36/14 455/436 |
| 2014/0341109 A1* | 11/2014 | Cartmell .............. H04L 45/308 370/328 |

\* cited by examiner

Fig. 4

| Frame control | Persistent /ID | Address 1 | Address 2 | Address 3 | Sequence control | Address 4 | Sequence control | QoS control | HT control | Frame body | FCS |

(a)

(b)

METHOD AND APPARATUS FOR PERFORMING HANDOVER IN WIRELESS COMMUNICATION SYSTEM

This application is a 35 USC § 371 National Stage entry of International Application No. PCT/KR2014/005646 filed on Jun. 25, 2014, and claims priority to U.S. Provisional Application No. 61/841,938 filed on Jul. 2, 2013, all of which are hereby incorporated by reference in their entireties as if fully set forth herein.

BACKGROUND OF THE INVENTION

Field of the Invention

The present invention relates to wireless communications, and more specifically, to a method and apparatus for performing handover in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a 3rd generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demands for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system.

In general, a 3GPP LTE(-A) or IEEE 802.16 cellular system with relatively broad coverage may be a primary RAT system, and a Wi-Fi system with relatively narrower coverage may be a secondary RAT system.

In general, in an interworking system of the cellular system and the WLAN system, all data flows transmitted/received through a secondary RAT system (e.g., Wi-Fi system) as well as a primary RAT system (e.g., cellular system) may be controlled by a device operating as a local mobility anchor (LMA). When a session for the Wi-Fi system already exists, a need for performing seamless handover for the cellular system may be required for simultaneous transmission.

SUMMARY OF THE INVENTION

The present invention provides a method and apparatus for performing handover in a wireless communication system. The present invention also provides a method and apparatus for transmitting/receiving information on routing modification in a wireless communication system.

In an aspect, a method for performing, by a user equipment (UE), handover in a wireless communication system is provided. The method includes transmitting measurement results configured for a secondary radio access technologies (RAT) system, receiving information on routing modification based on the measurement results, from a network entity of a primary RAT system, and performing a handover to a target access network according to the information on routing modification. The secondary RAT system is used for a user plane (U-plane) data, and the handover is determined based on at least one of a quality of service (QoS) information, load information about the primary RAT system and secondary RAT system, and a network preference information of the UE.

In another aspect, a wireless device in a wireless communication system is provided. The wireless device includes a radio frequency (RF) unit for transmitting or receiving a radio signal, and a processor coupled to the RF unit, and configured to transmit measurement results configured for a secondary radio access technologies (RAT) system, receive information on routing modification based on the measurement results, from a network entity of a primary RAT system, and perform a handover to a target access network according to the information on routing modification. The secondary RAT system is used for a user plane (U-plane) data, and the handover is determined based on at least one of a quality of service (QoS) information, load information about the primary RAT system and secondary RAT system, and a network preference information of the UE.

The embodiment of the present invention supports data and control transmission efficiency with dynamic cellular data flow sessions. Especially, the embodiment of the present invention supports seamless handover using routing information in interworking system having cellular and Wi-Fi environments.

BRIEF DESCRIPTION OF THE DRAWINGS

FIG. 4 shows an example of a frame structure of WLAN system which the present invention is applied.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
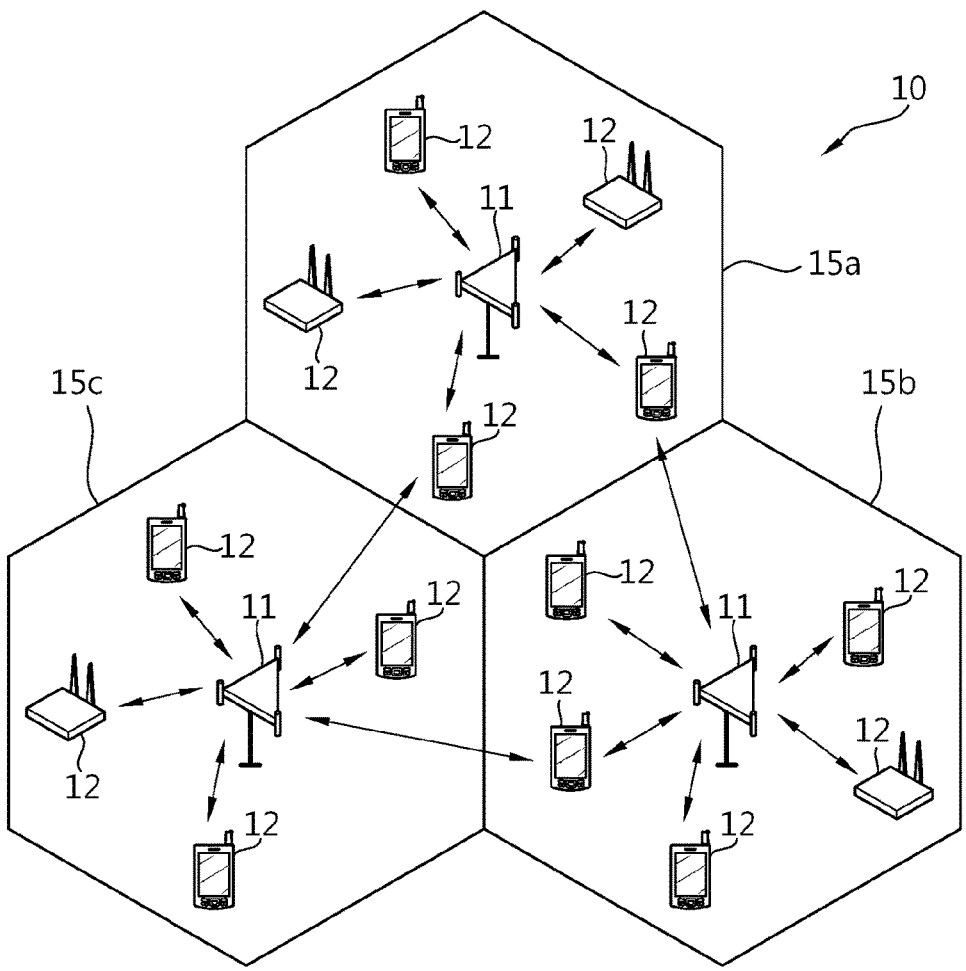
FIG. 1 shows a wireless communication system to which the present invention is applied.

FIG. 1 shows a wireless communication system to which the present invention is applied.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
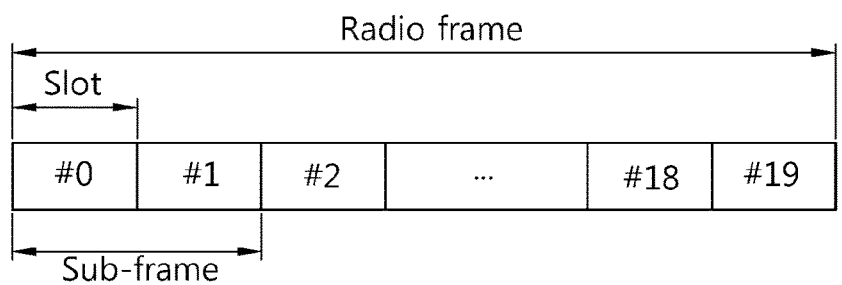
FIG. 2 shows an example of a radio frame structure to which the present invention is applied.

FIG. 2 shows an example of a radio frame structure to which the present invention is applied.

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary. 3GPP LTE defines that one slot includes seven OFDM symbols in a normal cyclic prefix (CP) and one slot includes six OFDM symbols in an extended CP.

Figure 3:
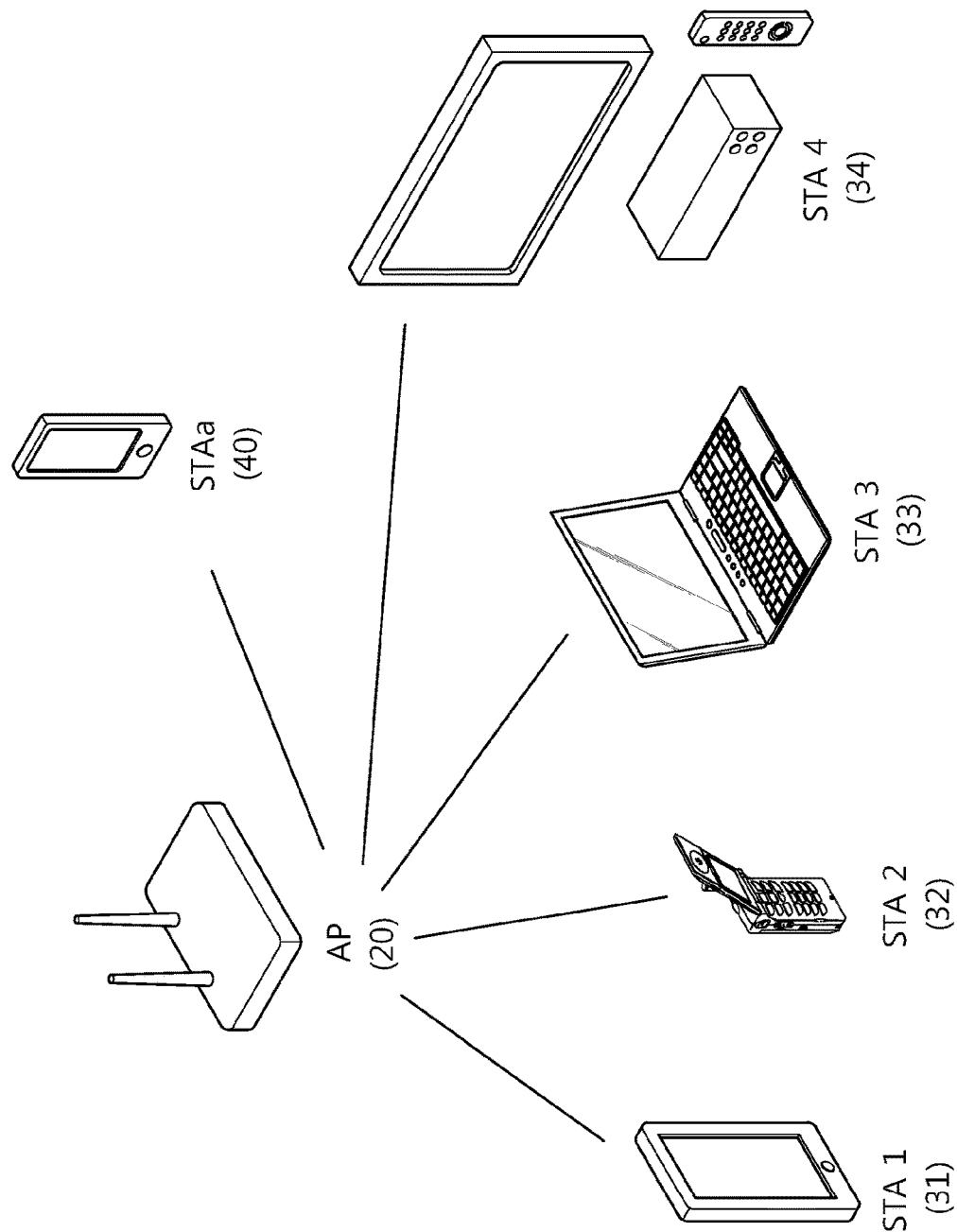
FIG. 3 shows a wireless local area network (WLAN) system which the present invention is applied.

FIG. 3 shows a wireless local area network (WLAN) system which the present invention is applied. The WLAN system may also be referred to as a Wi-Fi system.

Referring to FIG. 3, the WLAN system includes one access point (AP) 20 and a plurality of stations (STAs) 31, 32, 33, 34, and 40). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network. The STA is random functional medium that includes a physical layer interface for a wireless medium and a media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of WLAN system which the present invention is applied. A frame of WLAN system includes a set of fields in a fixed order.

Referring to FIG. 4, the frame includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan a network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation. Three states may exist according to an authentication and association procedure as shown Table 1.

TABLE 1

|  | Authentication | Association |
| --- | --- | --- |
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
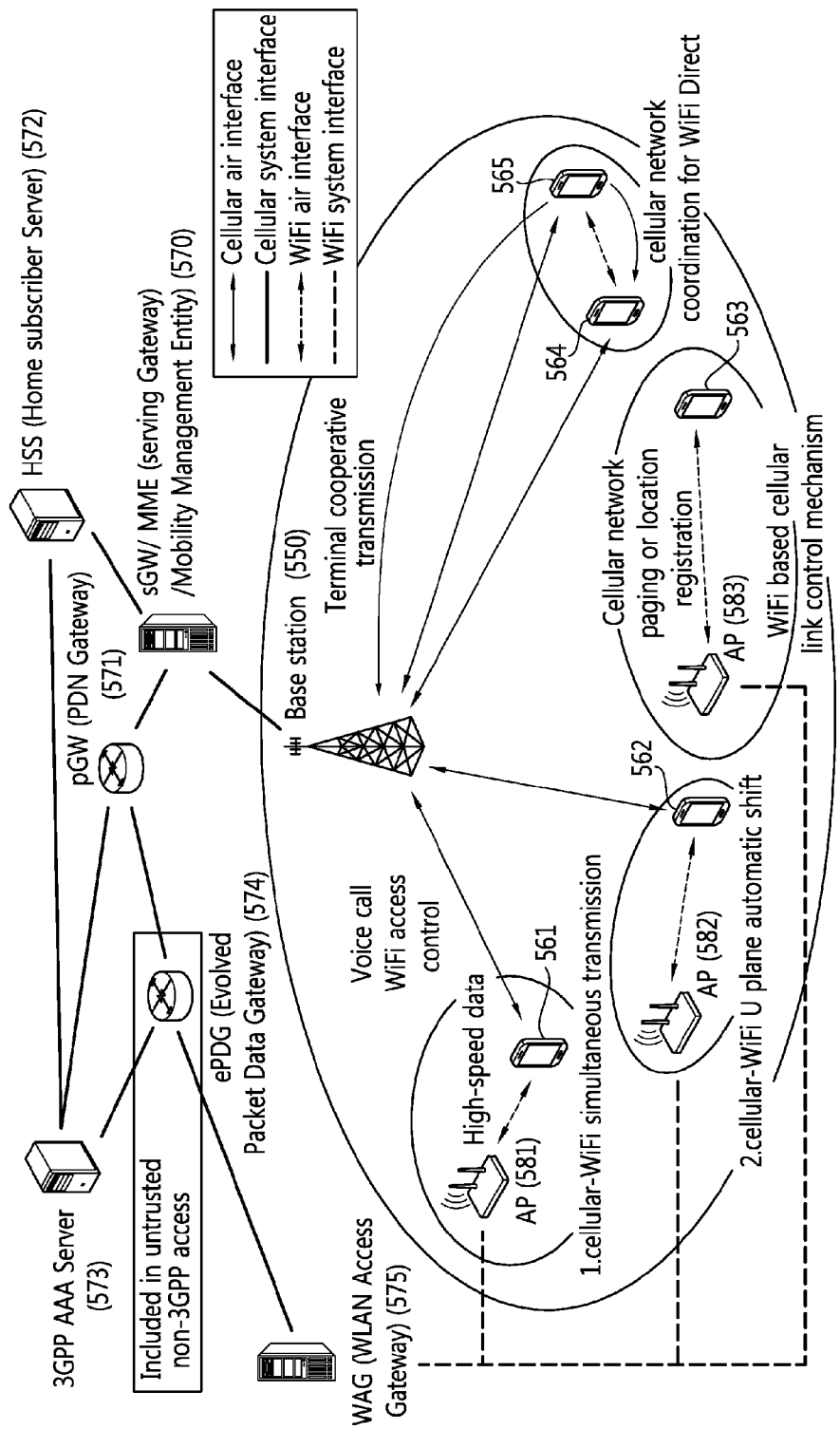
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 561, 562, 563, 564, and 565 in the coverage of the cellular base station 550. Each of the general devices 561, 562, 563, 564, and 565 may be a user equipment in a cellular system. The cellular base station 550 may communicate with each of the general devices 561, 562, 563, 564, and 565 via a cellular radio interface. For example, the cellular base station 550 may perform voice call communication with each of the general devices 561, 562, 563, 564, and 565 or may control access of each general device 561, 562, 563, 564, and 565 to a Wi-Fi system.

The cellular base station 550 is connected to a serving gateway (S-GW)/mobility management entity (MME) 570 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 570 is connected to a packet data network (PDN) gateway (P-GW) 571 and a home subscriber server (HSS) 572 through the cellular system interface. The PDN-GW is a gateway having a PDN as an end point.

The P-GW 571 and the HSS 572 are connected to a 3GPP access authentication authorization (AAA) server 573 through the cellular system interface. The P-GW 571 and the 3GPP AAA server 573 may be connected to an evolved packet data gateway (ePDG) 574 through the cellular system interface. The ePDG 574 may be included only in un-trusted non-3GPP access. The ePDG 574 may be connected to a WLAN access gateway (WAG) 575. The WAG 575 may be in charge of a P-GW in a Wi-Fi system.

Meanwhile, a plurality of APs 581, 582, and 583 may be present in the coverage of the cellular base station 550. Each of the APs 581, 582, and 583 may have coverage which is shorter than that of the cellular base station 550. Each of the APs 581, 582, and 583 may communicate with general devices 561, 562, and 563 that are present in its coverage through a Wi-Fi radio interface. In other words, the general devices 561, 562, and 563 may communicate with the cellular base station 550 and/or APs 581, 582, and 583. Communication methods of the general devices 561, 562, and 563 are as follows:

1) Cellular/Wi-Fi simultaneous radio transmission: the general device 561 may perform high-speed data communication with the AP 581 through a Wi-Fi radio interface while communicating with the cellular base station 550 through a cellular radio interface.

2) Cellular/Wi-Fi user plane automatic shift: the general device 562 may communicate with one of the cellular base station 550 and the AP 582 by user plane automatic shift. At this time, the control plane may be present in both the cellular system and the Wi-Fi system or only in the cellular system.

3) Terminal cooperative transmission: the general device 564 operating as a source device may directly communicate with the cellular base station 550 through a cellular radio interface or may indirectly communicate with the cellular base station 550 through a general device 565 operating as a cooperative device. That is, the cooperative device 565 may assist the source device 564 so that the source device 564 may indirectly communicate with the cellular base station 550 through itself. The source device 564 and the cooperative device 565 communicate with each other through a Wi-Fi radio interface.

4) Wi-Fi-based cellular link control mechanism: the AP 583 may perform a cellular link control mechanism such as paging or location registration of a network for the cellular general device 563. The general device 563 is not directly connected to the cellular base station 550 and may directly communicate with the cellular base station 550 thorough the AP 583.

Each of the APs 581, 582, and 583 is connected to the WAG 575 through a Wi-Fi system interface.

In general, in an interworking system of the cellular system and the WLAN system, all data flows may be transmitted and/or received simultaneously through a plurality of RAT systems (e.g., primary RAT system, secondary RAT system). In addition, all data flows transmitted/received through a secondary RAT system (e.g., Wi-Fi system) as well as a primary RAT system (e.g., cellular system) may be controlled by a device operating as a local mobility anchor (LMA). For example, data to be transmitted through a cellular system and data to be transmitted through a Wi-Fi system always go through the P-GW. That is, in FIG. 5, a device serving as an LMA may be the P-GW. In this regard, a term "LMA" used in a proxy mobile Internet protocol (PMIP) protocol may be called a different term in another protocol, such as home agent (HA).

When data flows are transmitted through the plurality of RAT systems simultaneously in the converged communication system of the cellular system and the Wi-Fi system, scenarios for simultaneous transmission may be classified into a user plane (U-plane) separation for the same data flow (or, bandwidth/U-plane aggregation) and U-plane separation for different data flows (or, bandwidth/U-plane segregation).

Figure 6:
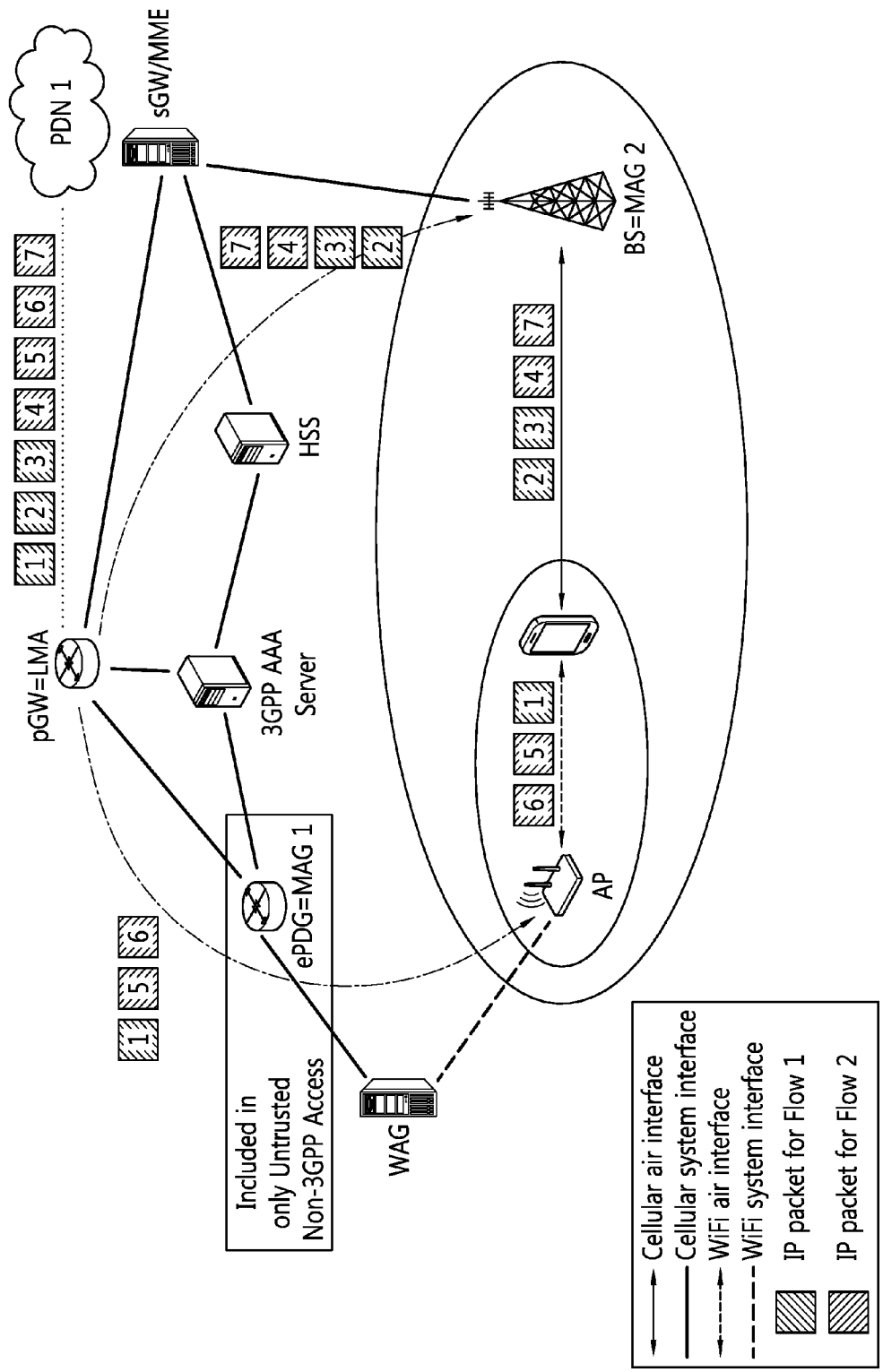
FIG. 6 shows an example of IP flow mobility in a converged communication system of a cellular system and a Wi-Fi system.

FIG. 6 shows an example of IP flow mobility in a converged communication system of a cellular system and a Wi-Fi system. FIG. 6 shows U-plane separation for the same data flow, i.e., bandwidth/U-plane aggregation.

Referring to FIG. 6, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packet 1 in the IP packet for flow 1 is transmitted to the UE through the Wi-Fi system by going through an ePDG and/or a WAG, and IP packets 2 and 3 are transmitted to the UE through the cellular system by going through a BS. In this case, the ePDG or the WAG may be a mobile access gateway (MAG) in the Wi-Fi system, and the BS may be a MAG in the cellular system. In the IP packet for flow 2, the IP packets 5 and 6 are transmitted to the UE through the Wi-Fi system by going through the PDG and/or the WAG, and IP packets 4 and 7 are transmitted to the UE through the cellular system by going through the BS. That is, IP packets for different flows are aggregated each other.

Figure 7:
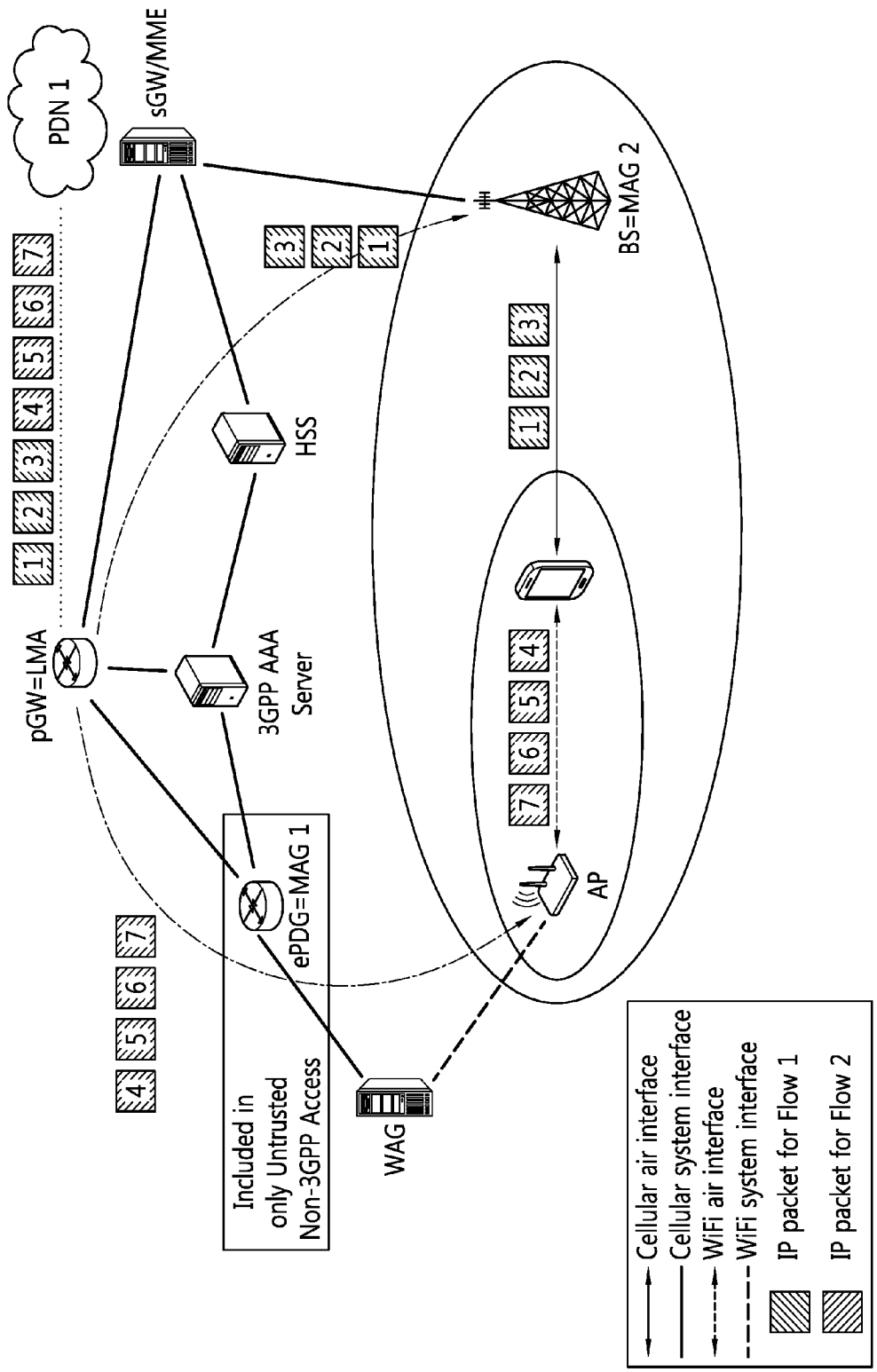
FIG. 7 shows another example of IP flow mobility in a converged communication system of a cellular system and a Wi-Fi system.

FIG. 7 shows another example of IP flow mobility in a converged communication system of a cellular system and a Wi-Fi system. The FIG. 7 shows U-plane separation for different data flows, i.e., bandwidth/U-plane segregation.

Referring to FIG. 7, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packets for flow 1 are transmitted to the UE through the cellular system by going through a BS. In this case, the BS may be an MAG in the cellular system. The IP packets for flow 2 are transmitted to the UE through the Wi-Fi system by going through the ePDG and/or the WAG. In this case, the ePDG or the WAG may be an MAG in the Wi-Fi system. That is, IP packets for different flows are segregated each other.

In scenarios for simultaneous transmission, a method for establishing, by a network, a session to support seamless connectivity for data flows may be required. Accordingly, according to an embodiment of the present invention, a method for establishing, under the control of a primary RAT system, a data flow session for the same PDN in the primary RAT system is described. In a following description, it is assumed that the primary RAT system is a 3GPP LTE system and the secondary RAT system is a Wi-Fi system, but the present invention is not limited thereto. In a following description, it is assumed that a mobility IP network protocol is a PMIP, but the present invention is not limited thereto. The present invention may be applied to other protocols, such as a dual stack mobile IP (DSMIP) protocol, GPRS tunneling protocol (GP), etc. In addition, in the secondary RAT system, it is assumed that a data flow session for the same PDN already exists. Further, the this present embodiment may provide a support that allows all data flows to be transmitted and received through the most appropriate RAT among multiple RAT systems, and such transmission may be defined as U-plane switch.

Figure 8:
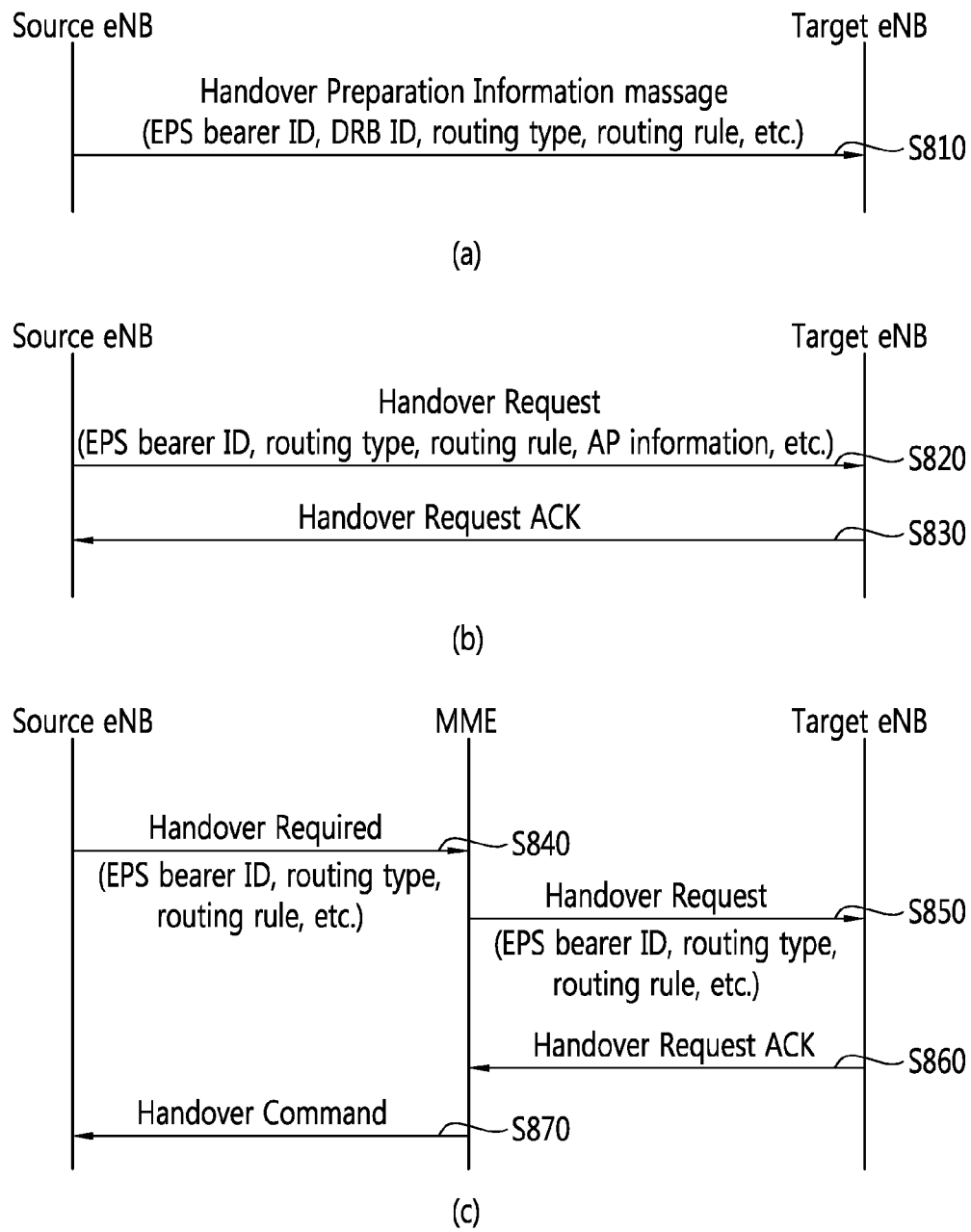
FIG. 8 and FIG. 9 show methods for transmitting and receiving a message to change routing information according to an embodiment of the present invention.

As described above, in order to provide seamless connectivity with respect to a data flow in the simultaneous transmission scenario, a more effective handover scheme under a control of a network is required. Hereinafter, FIG. 8 shows methods for transmitting and receiving a message to change routing information according to an embodiment of the present invention.

Here, in the present disclosure, it is assumed that a primary RAT system is a 3GPP LTE system and a secondary RAT system is an IEEE 802.11 (Wi-Fi) system, and some procedures may be modified to be applied as needed for a newly defined communication system. Also, due to a simultaneous transmission scenario, it is assumed that a data flow session is already present in the secondary RAT system as well as in the primary RAT system. Here, in the primary RAT system, a general device falls to a state of EMM-Registered+ECM-Connected+RRC-Connected, and one or more bearers retained by the corresponding device are activated. Also, in the secondary RAT system, a general device is in an associated state and transmits and receives data through a data flow session.

In the present invention, a method for moving (handover) a general device having a session to which U-plane separation is applied or a particular session/flow based on a primary RAT system control is as follows. First, a serving BS may be changed from eNB 1 to eNB 2, and routing information of each session is changed as shown in Table 2 and Table 3.

TABLE 2

| U-plane aggregation → U-plane segregation | U-plane aggregation → U-plane switch |
|---|---|
| Transmission RAT = Cellular (eNB & AP → eNB) | Switch RAT = Cellular (eNB & AP → eNB) |

TABLE 2-continued

| U-plane aggregation → U-plane segregation | U-plane aggregation → U-plane switch |
|---|---|
| Transmission RAT = WiFi (eNB & AP → AP) | Switch RAT = WiFi (eNB & AP → AP) |

TABLE 3

| U-plane segregation → U-plane aggregation | U-plane segregation → U-plane switch |
|---|---|
| Transmission RAT = Cellular (AP → eNB & AP) | Switch RAT = Cellular (AP → eNB) |
| Transmission RAT = WiFi (eNB → eNB & AP) | Switch RAT = WiFi (eNB → AP) |

Here, in a case in which several flows are mapped within a single bearer, when only a particular flow is determined to be routed, a routing type is set as a bandwidth aggregation. Also, in the 3GPP system, a UE and a P-GW share traffic flow description information, e.g., source and destination IP address and port numbers and the protocol information, as a traffic flow template within protocol configuration options.

In the present invention, when a UE and a P-GW want to route only a particular flow, they transmit traffic flow description information of the corresponding flow to start to provide (or inform) which flow of the corresponding EPS bearer is to be routed. The reason for providing the necessity of transmitting information to a different RAN cellular entity (e.g., eNBs) is because a serving/source BS of a general device may be changed without changing a session(s) to which U-plane separation is applied, and thus, a general device and a cellular entity (e.g., source eNB, MME, new entity) should transmit U-plane separation-related information of the corresponding device to a target BS during an existing handover (HO) process.

According to the present invention, the U-plane separation-related information may include EPS bearer IDs to which U-plane separation has been applied. Here, a different ID (e.g., E-RAB ID, DRB ID, LCID) mapped to the corresponding EPS bearer ID may be transmitted additionally or in a substituted manner. Also, the U-plane separation-related information may include U-plane separation-applied flow IDs, a routing type (U-plane aggregation/segregation/switch) with respect to each bearer/flow, a routing rule (transmission ratio through each RAT system/transmission RAT/switch RAT) with respect to each bearer/flow, information (e.g., BSSID, SSID, homogeneous extended SSID (HESSID), frequency channel—operating class, channel number) regarding one or more entities (e.g., AP) performing data transmission and reception in a secondary RAT system (e.g., WLAN/WiFi), signal strength measurement values of AP(s), etc.

Here, elements of systems affecting a change in routing information (e.g., flow ID, routing type/rule) may include load (cellular/WLAN), radio link quality (cellular/WLAN), QoS requirement, user preference, etc. According to values of the corresponding elements, routing information applied to a session may be changed or reapplied as shown in Table 4 below.

TABLE 4

| Case 0 | U-plane aggregation → U-plane aggregation |
|---|---|
| Case 1 | U-plane aggregation → U-plane segregation |

TABLE 4-continued

| | |
|---|---|
| Case 2 | U-plane aggregation → U-plane switch |
| Case 3 | U-plane segregation → U-plane aggregation/switch |
| Case 4 | U-plane segregation → U-plane switch |

Hereinafter, a process of transmitting information related to U-plane separation through a message according to a following interface is described. A subject of transmitting the U-plane separation-related information is a source eNB. The U-plane separation-related information is transmitted and received through a direct interface (e.g., X2) between a source eNB and a target eNB. Also, U-plane separation-related information may be transmitted using HO preparation information or an HO request message. Herein, as for the HO preparation information message, it is used to transfer the E-UTRA RRC information used by the target eNB during handover preparation, including UE capability information. And, the HO request message is used to request the preparation of resources at the target side.

As illustrated in FIG. 8(a), the source eNB transmits HO preparation information including EPS bearer ID, DRB ID, routing type, routing rule, etc., to the target eNB (S810). Upon receiving the HO preparation information, the target eNB prepares handover.

As illustrated in FIG. 8(b), the source eNB transmits an HO Request message including EPS bearer ID, routing type, routing rule, AP information, etc., to the target eNB (S820), and the target eNB transmits an ACK signal indicating that the foregoing information items have been normally received (S830).

As illustrated in FIG. 8(c), the U-plane separation-related information may be transmitted using an indirect interface (e.g., S1) between the source eNB and the target eNB. For example, an HO required message & HO request message may be used. This message is used to request the preparation of resources at the target side via the EPC. The source eNB transmits an HO required message including EPS bearer ID, routing type, routing rule, etc., to an MME (S840), and upon receiving the HO required message from the source eNB, the MME transmits an HO request message including EPS bearer ID, routing type, routing rule, etc., to the target eNB (S850). The target eNB transmits an ACK signal to the MME in order to indicate that the corresponding information items have been normally received and handover is prepared (S860). The MME instructs the source eNB to perform handover through a handover command message (S870).

Figure 9:
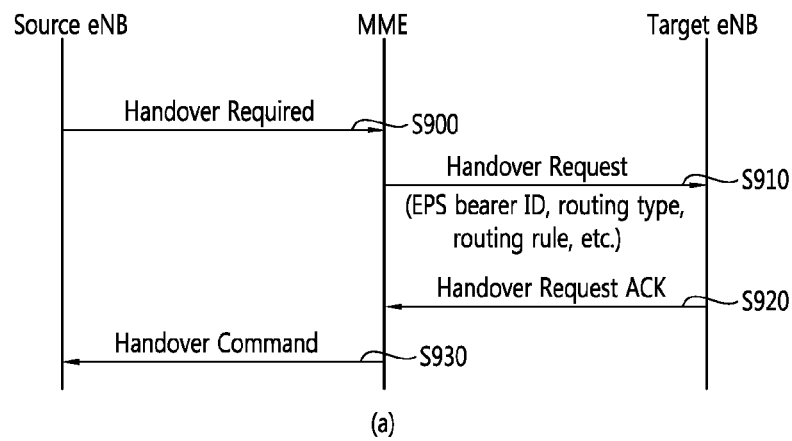
Figure 9:
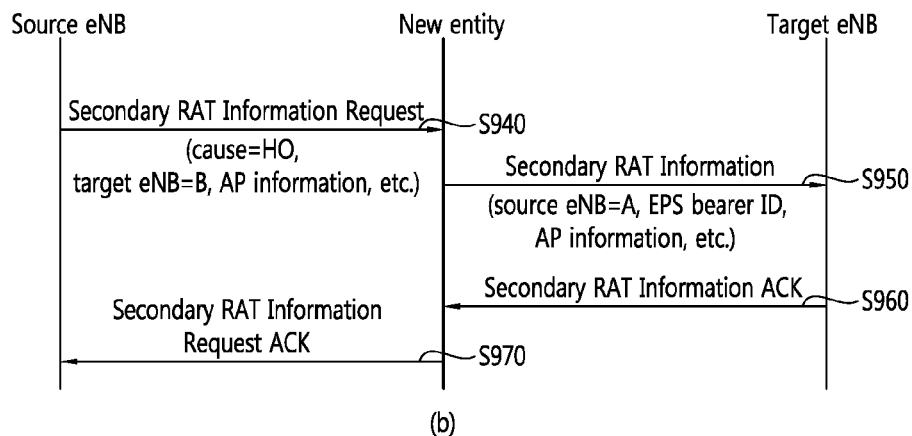

FIG. 9 shows a case in which a subject transmitting U-plane separation-related information is an MME or a new entity.

Referring to FIG. 9(a), upon receiving a handover required message indicating that handover needs to be performed from the source eNB (S900), the MME recognizes a bearer and a service type used in the source eNB and transmits an HO request message including an EPS bearer ID, a routing type, a routing rule, etc., to the target eNB (S910). Upon receiving the corresponding information normally, the target eNB includes information indicating that handover is ready in an ACK signal and transmits the same to the MME (S920). The MME instructs the source eNB to perform handover through a handover command message (S930). This is a scheme of further including U-plane separation-related information in the existing HO request message and transmitting the same. This message is used to request the preparation of resources at the target side via the EPC.

Meanwhile, referring to FIG. 9(b), in the present invention, a secondary RAT information request or a secondary RAT information request ACK message is newly defined, and information such as a bearer and a service type used by the corresponding device may be transmitted to the target eNB by using these messages. The source eNB defines a cause value with respect to a message generation as handover, and transmits a secondary RAT information request message including information about a target eNB and AP information to the MME (S940). The MME checks the cause value, the information about the target eNB, and the AP information, and transmits a secondary RAT information message including information about the source eNB, information about an EPS bearer ID of the device to be handed over, and AP information to the target eNB (S950). The target eNB checks the EPS bearer ID and handover possibility, and includes information indicating handover preparation completion in a secondary RAT information ACK and transmits the same to the MME (S960). The MME delivers the secondary RAT information ACK message to the source eNB and instructs handover (S970).

Figure 10A:
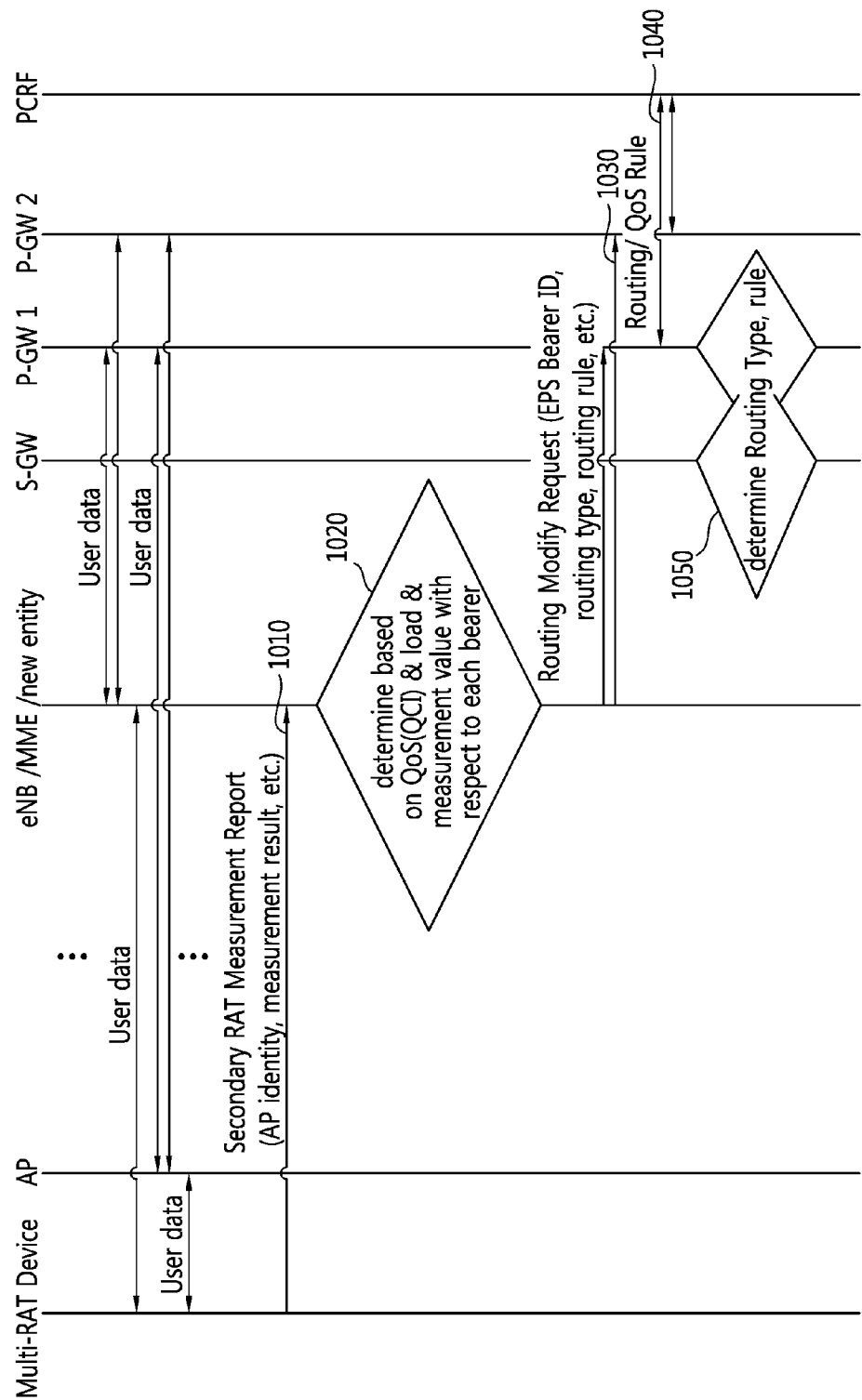
FIG. 10 to FIG. 15 show examples of changing routing information according to an embodiment of the present invention.
Figure 10B:
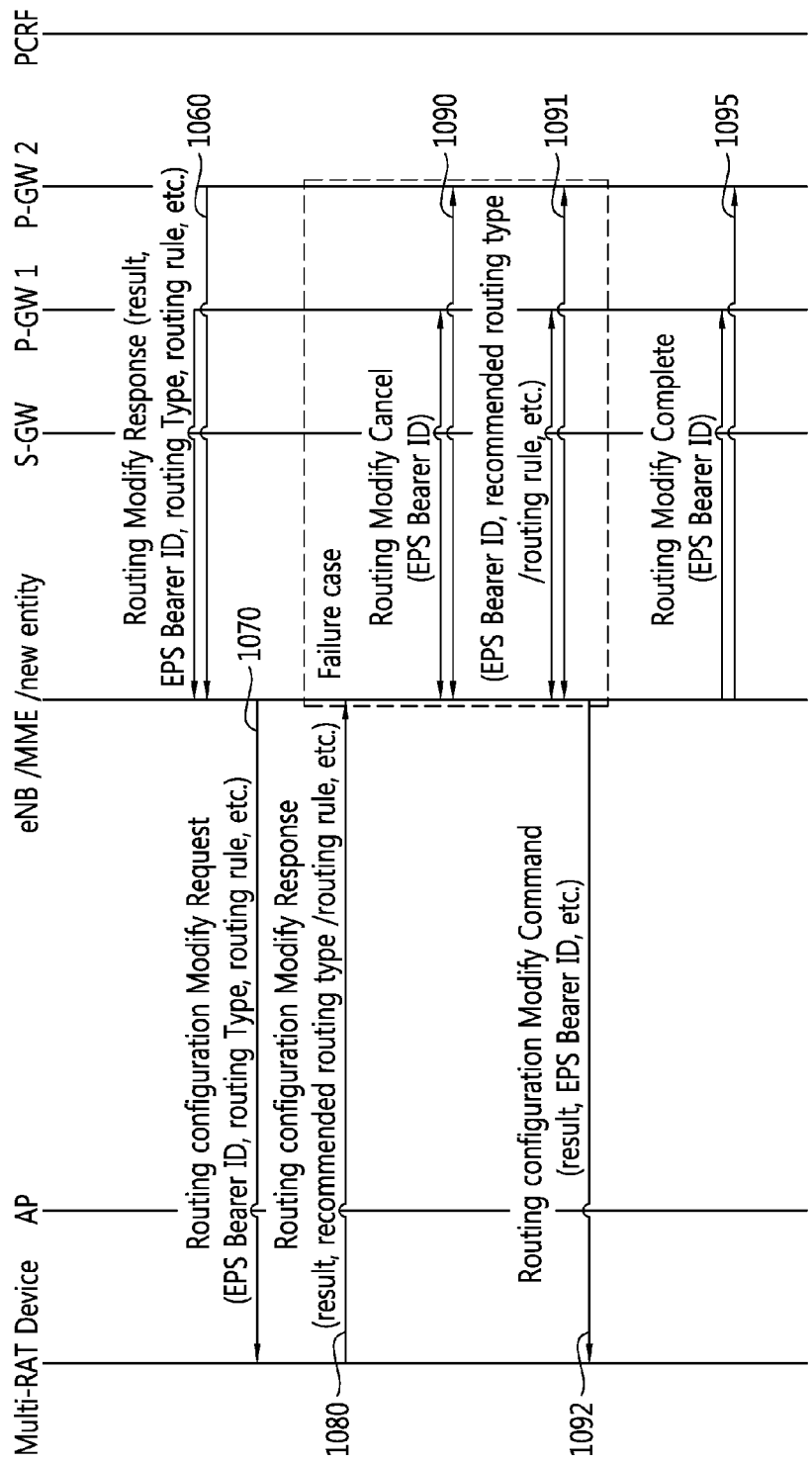

FIG. 10 shows an example of changing routing information of a session to which U-plane aggregation is applied according to an embodiment of the present invention. In FIG. 10, a signaling flow in case of case 0 (U-plane aggregation→U-plane aggregation) and case 1 (U-plane aggregation→U-plane segregation) is illustrated.

Referring to FIG. 10, a general device reports measurement results of a secondary RAT (e.g., WiFi) to an LTE system entity (1010). Here, the LTE system entity may include an eNB/MME, and a new entity capable of controlling a bearer like an eNB/MME, when a new system are applied. The general device transmits identification information (e.g., BSSID, SSID, HESSID) for identifying a connected AP and signal strength measurement results with respect to a corresponding AP(s). As a measurement configuration and report for transmission of the measurement results, a message of an LTE system, e.g., RRCConnectionReconfiguration, UE Measurement Report, may be used. Alternatively, in the present invention, for example, a secondary RAT measurement report may be newly defined and measurement results may be included in the secondary RAT measurement report message and transmitted. Here, for example, the measurement configuration may include Type of measurement: Inter-RAT, Measurement report triggering: Inter RAT neighbor becomes better than threshold, etc.

Upon receiving the measurement report, the network (for example, the LTE system entity) determines whether routing information needs to be modified based on QoS with respect to each bearer or a flow of bearers (QCI: quality class identifier, ARP: allocation and retention priority, bit rate of traffic per bearer, bit rates of traffic per group of bearers) applied to U-plane aggregation owned by the corresponding general device, WiFi and LTE signal measurement results reported by the general device, and radio air/network load (1020). In this case, when it is determined that the routing information needs to be modified, the LTE system entity determines a routing type (=U-plane aggregation/segregation/switch) and a routing rule (transmission ratio, transmission RAT, switch RAT).

Thereafter, the LTE system entity transmits routing modify request including following information to P-GW(s) corresponding to the determined PDN(s) (1030). The routing modify request information may include EPS bearer IDs whose routing information is to be modified, flow IDs whose routing information is to be modified, a routing type (U-plane aggregation/segregation) of each EPS bearer/flow, a routing rule (transmission ratio, transmission RAT=cellular or WiFi) with respect to each EPS bearer/flow, etc. In this case, by including all of routing rules for each routing type, the routing modify request information may be utilized as information for a P-GW to finally determine a routing type and a rule. For example, FIG. 10 shows a case in which a general device receives user data from a P-GW1 and P-GW2. Here, the routing modify request may be configured by adding other element information required by a communication system to which the present invention is applied, and a portion of the information may be removed when necessary. Also, the routing modify request information may be transmitted through a routing modify request message.

Upon receiving the routing modify request, the P-GW obtains a routing type and rule with respect to a corresponding bearer/flow from a PCRF (1040). The PCRF, an entity that performs policy related to user billing, handles a billing policy with respect to a service of the general device.

Further, each P-GW determines whether to modify a corresponding bearer and a routing type/rule (1050) based on routing type/rule obtained from the LTE system entity and the PCRF. In a case in which several flows are mapped to a single bearer, when routing information of only a particular flow is determined to be modified, each P-GW sets a routing type as U-plane aggregation as is.

Each P-GW informs the LTE system entity about the results, namely, whether a bearer has been modified and about the routing type/rule (1060). The modified information may be transmitted through a routing modify response message. The routing modify information may include a response (accept/reject) with respect to a request from the LTE system entity, EPS bearer ID whose routing information needs to be modified, flow ID whose routing information needs to be modified, etc.

Here, in the 3GPP system, the UE and the P-GW share traffic flow description information (e.g., source and destination IP address and port numbers and the protocol information) as traffic flow template within protocol configuration options. Also, in a case in which routing information of only a particular flow is determined to be modified, each P-GW may deliver traffic flow description information to be modified, thereby informing the UE about how which flow within a corresponding EPS bearer is routing-modified.

Also, the routing modify information may further include information about a routing type which indicates a type of simultaneous transmission to be modified in each EPS bearer/flow (U-plane aggregation/segregation), and a routing rule which indicates a simultaneous transmission rule to be modified in each EPS bearer/flow (in case of U-plane aggregation, transmission through each RAT system/in case of U-plane segregation, transmission RAT)

When the result within the received response message is 'accept', the LTE system entity temporarily stores the information for modifying simultaneous transmission of the general device (e.g., a P-GW to which simultaneously transmission is to be applied, etc.). Also, when the result is 'accept', the LTE system entity informs the general device about the simultaneous transmission modify information (1070). The routing modify information is transmitted through a routing configuration modify request message, and the message may include EPS bearer ID whose routing information is to be modified, flow ID whose routing information is to be modified, routing type which indicates a type of simultaneous transmission to be modified in DRB/EPS bearer/flow (U-plane aggregation/segregation), routing rule which indicates a simultaneous transmission rule to be modified in each DRB/EPS bearer/flow (in case of U-plane aggregation, a transfer rate through each RAT system/in case of U-plane segregation, transmission RAT). Here, with respect to the EPS bearer ID, the LTE system entity may additionally or transmit any other ID (e.g., E-RAB ID, DRB ID, LCID) mapped to the corresponding EPS bearer ID in a substituted manner.

In response to the request message, the general device may transmit a routing configuration modify response message to the LTE system entity (1080). The routing configuration modify response message may include a result which indicates a response with respect to a request from the LTE system entity (accept/reject) and information regarding recommended EPS bearer ID/flow ID/routing type/routing rule.

Here, when the result is 'reject', the general device may include the corresponding reject information. Meanwhile, when the result is 'accept', the general device applies modified routing information to UL data of a corresponding bearer/flow.

The LTE system entity may perform different procedures according to a response message received from the general device.

First, in the case in which the result within the response message is 'accept', the LTE system entity informs the P-GW about the fact by using a routing configuration modify complete message (1090). When the result is 'accept', the P-GW applies the modified routing information to DL data of corresponding bearer/flow.

Meanwhile, when the result within the response message is 'failure' and the recommended information is not included, the LTE system entity requests the corresponding P-GW(s) to cancel the previous routing modify request (step 1030), and deletes the contents temporarily stored in step 1070. Upon the receipt of it, the P-GW(s) cancels the corresponding modify request (1090).

Also, when the result within the received response message is 'failure' and the recommended information is included, the LTE system entity performs the procedure of step 1030 according to the recommended information (1091) and informs the general device about the result (1092). Here, the LTE system entity provides the result, EPS bearer ID, etc., through a routing configuration modify command message. Thus, the general device applies the modified routing information to UL data of a corresponding bearer/flow. Here, the result with respect to the recommended information includes information requested by the general device.

In addition, in a case in which a routing type to be modified is U-plane segregation and there is no more data to be transmitted i) through a corresponding EPS bearer (cellular session) or ii) through a WiFi session mapped to the corresponding EPS bearer, the following additional operation (success case) may be performed.

First, in a case that there is no more data to be transmitted through a corresponding EPS bearer (cellular session), and the general device moves to the WiFi system, the following operations may performed. Here, a case in which the default bearer is U-plane separated to the WiFi system and a dedicated bearer is still maintained in the LTE system may be excluded. Namely, when an EPS bearer which is U-plane separated to a WiFi system corresponds to a linked EPS bearer ID of any other EPS bearer operating in the LTE system, the process may not be performed.

The P-GW or the LTE system entity (e.g., MME) releases or deactivates the corresponding EPS bearer. Also, E-RAB ID and DRB ID/LCID (allocated by eNB) mapped to the corresponding EPS bearer are released/deactivated together by the LTE system entity (e.g., MME, eNB). The DRB ID/LCID release may be configured by using, e.g., RRC-ConnectionReconfiguration of the LTE system procedure. When the message is received, the general device stops transmitting the UL data. Also, E-RAB ID release may be configured by using, e.g., E-RAB RELEASE COMMAND, E-RAB Release INDICATION.

On the other hand, in a case that there is no more data to be transmitted through a WiFi session mapped to a corresponding EPS bearer, and the general device moves to the LTE system, the P-GW or the LTE system entity releases/deactivates a WiFi session mapped to the corresponding EPS bearer. Here, in the case of modifying the routing type to U-plane segregation, a routing type may be explicitly set to U-plane segregation, but it may be implicitly informed by modifying transmission ratio with respect to one RAT to 0 in routing rule.

Figure 11A:
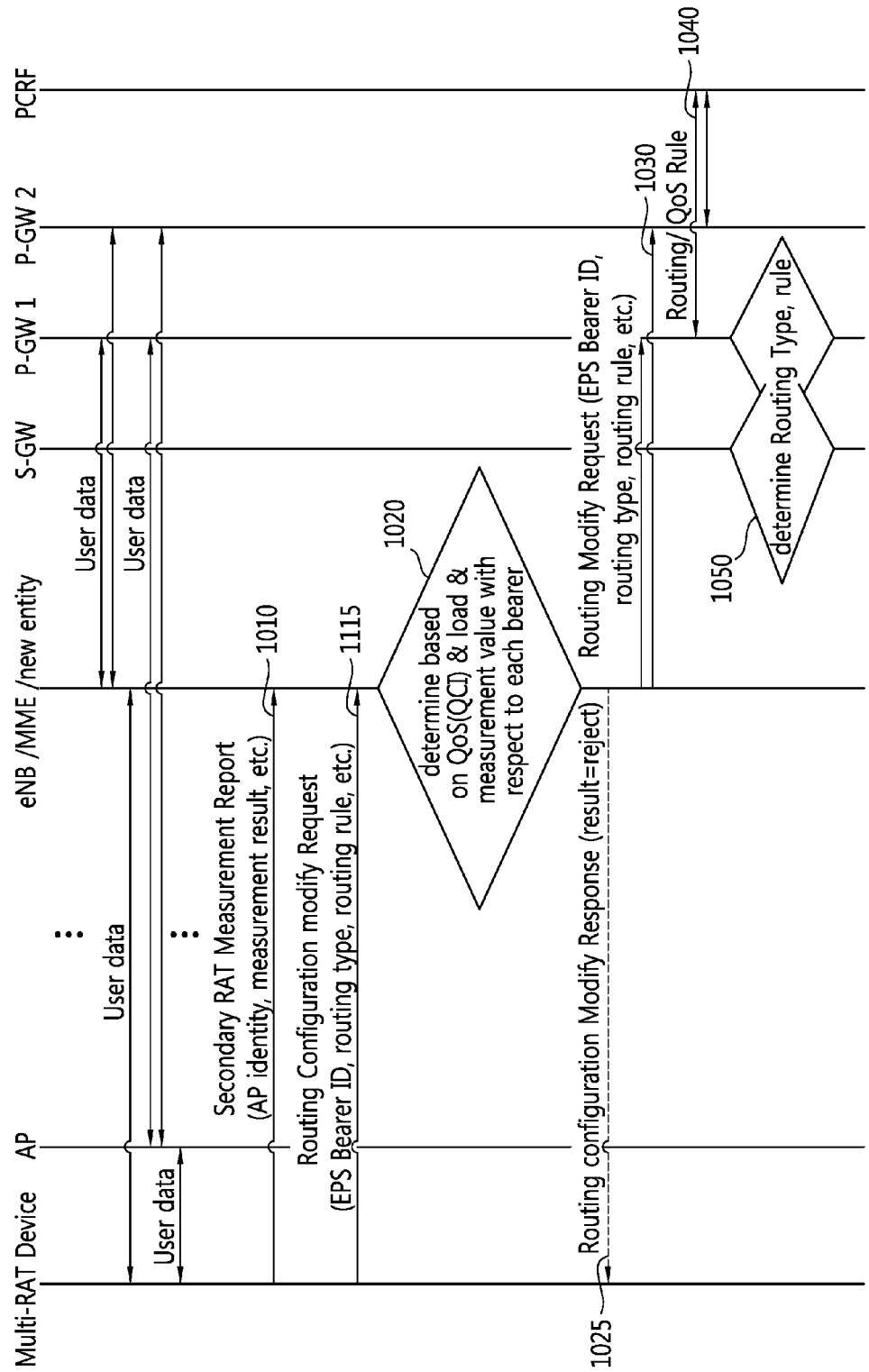
Figure 11B:
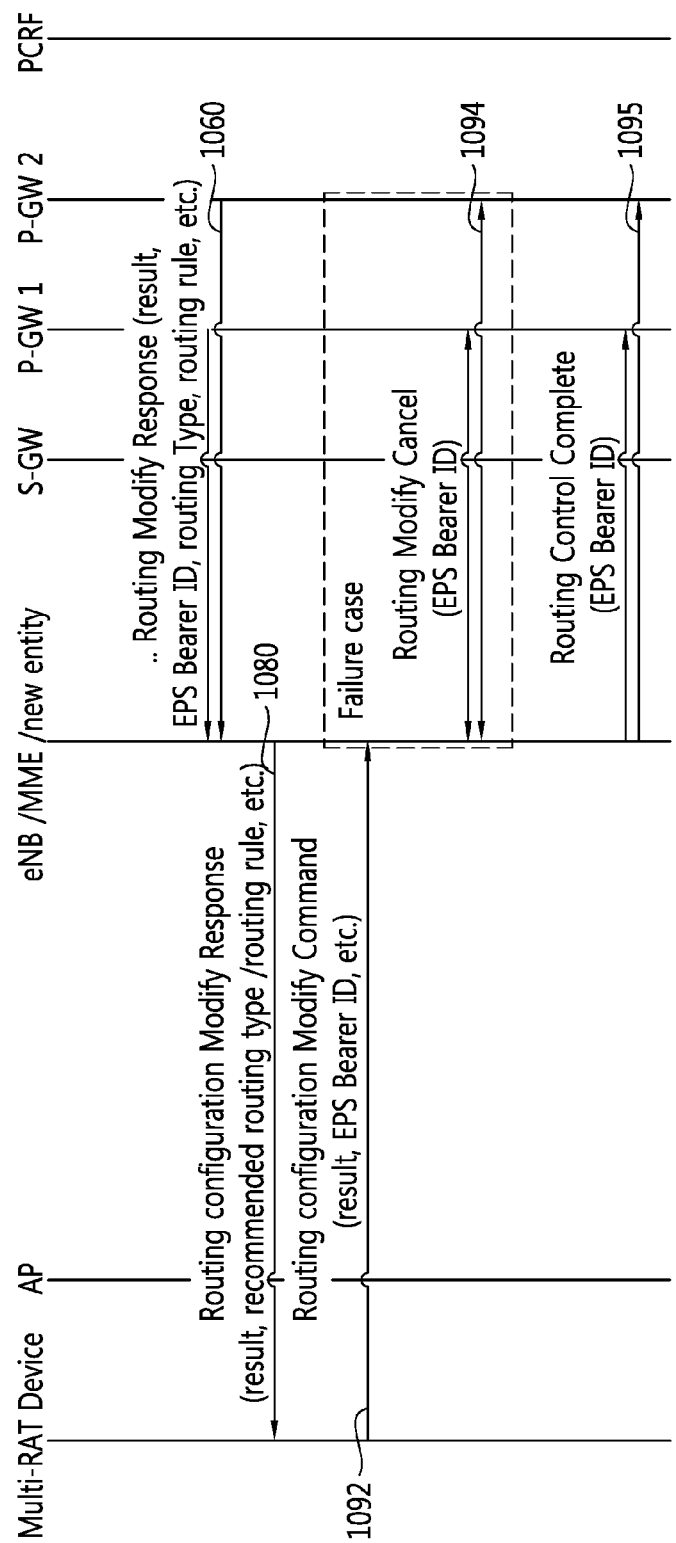

So far, the case in which routing modification is requested by a network has been described in FIG. 10. FIG. 11 shows a case in which routing modification is requested by a general device according another embodiment of the present invention. It is obvious that transmission of the same information in the same steps as those of FIG. 10 is included, and hereinafter, only steps added according to determination of the general device are additionally described.

Referring to FIG. 11, after the general device reports measurement result with respect to secondary RAT (e.g., WiFi) to the LTE system entity (1010), the general device transmits a routing configuration modify request message including routing modify information to the LTE system entity (1115). The routing configuration modify request message includes information regarding EPS bearer, routing type, routing rule, etc. This includes information that a request for modifying routing starts by the general device.

The LTE system entity checks the received routing modify information through the request message, determines whether the corresponding routing needs to be modified (1020), and subsequently transmits a routing configuration modify response message including results with respect to whether to modify routing according to the routing modify information to the general device (1025). In FIG. 11, for example, a case in which the result as to modification is reject is shown, and when the modify result is accepted, a response message including modified routing modify information may be transmitted.

Meanwhile, in response to the routing modify request message (1015), the LTE system entity may perform a routing configuration modify procedure with each P-GW (steps 1030 to 1060 as the modify procedure are the same as those of FIG. 10 described above), and transmit a routing response message including a result, recommended routing type/routing rule to the general device (1080). The routing response message includes information regarding routing modification requested by the general device. As an acknowledgement with respect to the response message, the general device transmits a routing configuration modify command message to the LTE system entity (1092). The routing configuration modify command message may include a result, EPS bearer ID, etc.

In addition, when routing modify is rejected by the general device, the LTE system entity may request the corresponding P-GW(s) to cancel the previous routing modify request (cancel is identified by EPS bearer ID) (1094). Also, when routing modify is accepted, a routing modify complete (modify complete is identified by EPS bearer ID) may be requested (1096).

Figure 12A:
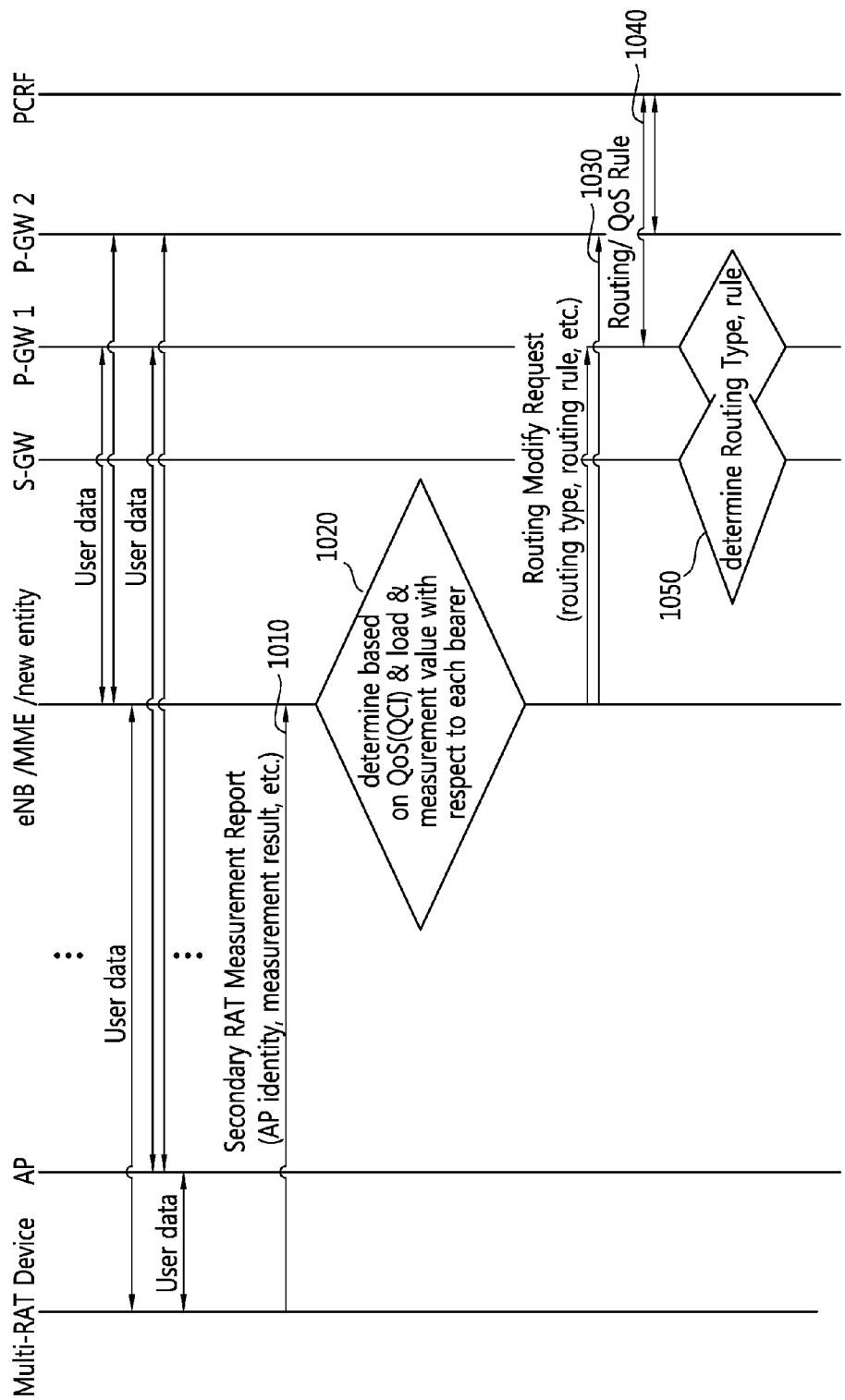
Figure 12B:
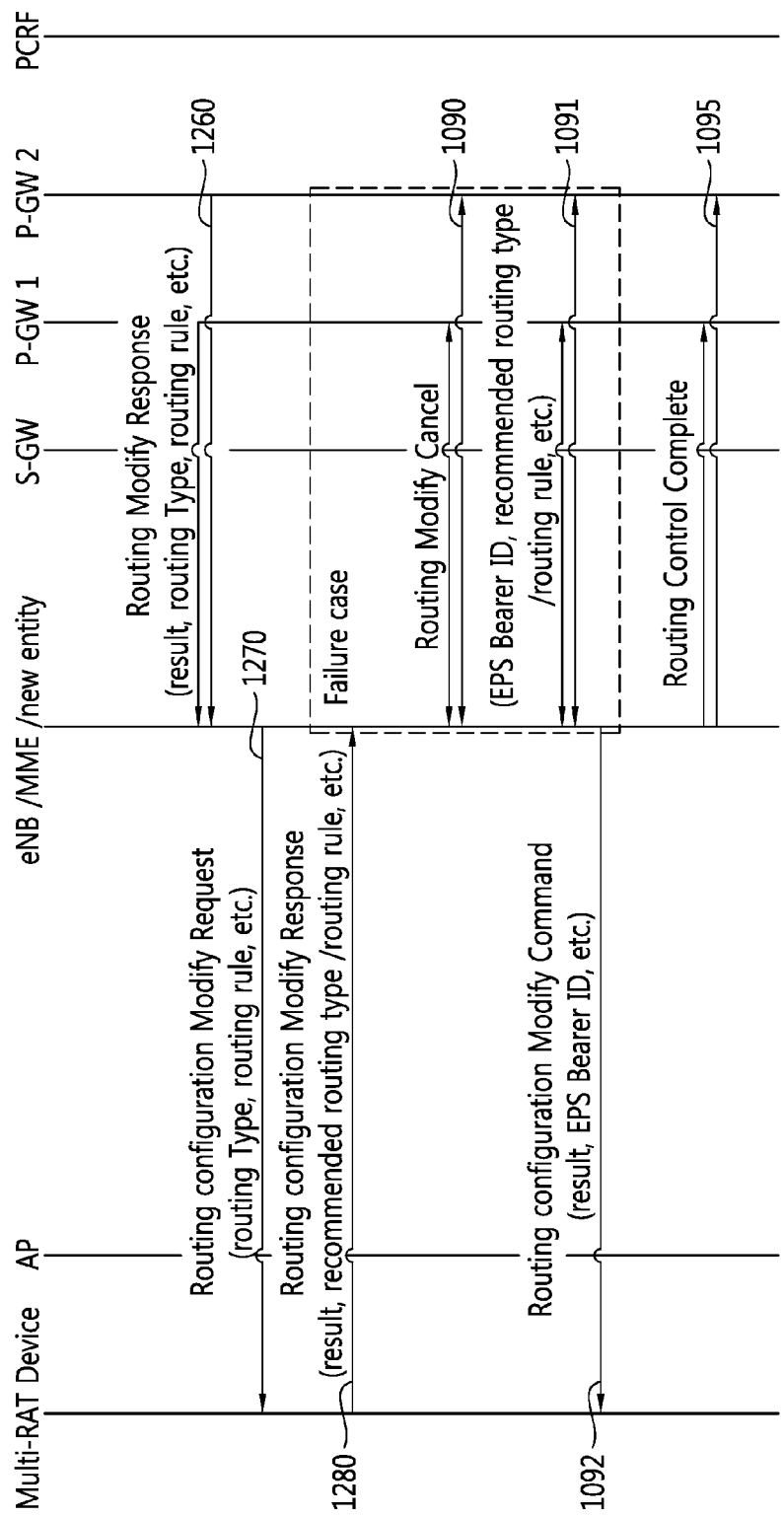

FIG. 12 shows a signaling flow in case 2 (U-plane aggregation→U-plane switch) according to an embodiment of the present invention. Referring to FIG. 12, the same procedure as that of FIG. 10 is performed, and information included in some steps may be different.

The general device reports the measurement result with respect to the secondary RAT (e.g., WiFi) to the LTE system entity (1010). Here, the measurement result report includes identification information (e.g., BSSID, SSID, HESSID) for identifying an accessed AP and a signal strength measurement result with respect to corresponding AP(s). This is the same as step 1010 of FIG. 10.

The LTE system entity determines whether routing information needs to be modified (1020). This includes step 1020 of FIG. 10. Thereafter, the LTE system entity transmits a routing modify request including the following information to P-GW(s) corresponding to all the PDN(s) owned by a corresponding device according to the determined routing type (=U-plane switch) (1030).

The routing modify request includes a routing type (U-plane switch), a routing rule which indicates U-plane separation rule to be modified (=switch RAT: cellular (to eNB)/WiFi (to AP)). In this case, the routing modify request may include all the routing rules with respect to other routing types (bandwidth aggregation/segregation), so that the P-GW may utilize the information in finally determining a single routing type and rule.

Upon receiving the routing modify request, each P-GW obtains a routing type and rule with respect to the corresponding bearer/flow from the PCRF (1040), and determines whether to modify with respect to the corresponding bearer and routing type/rule (1050). Each P-GW informs the LTE system entity about the result (1260). The routing modify response includes information regarding a result which indicates a response (accept/reject) with respect to a request from the LTE system entity, routing type which indicates U-plane separation type to be modified (=U-plane switch), routing rule which indicates U-plane separation rule to be modified (switch RAT).

When the result within the received message is 'accept', the LTE system entity temporarily stores modify information for U-plane switch of the general device, and provides the modify information for U-plane switch to the general device. The modify information is transmitted through a routing configuration modify request message, and the message includes routing type which indicates U-plane separation type to be modified (=U-plane switch) and routing rule which indicates U-plane separation rule to be modified (switch RAT).

The general device may transmit a routing configuration modify response message in response to the request message (1280). The response message may include a result which indicates a response (accept/reject) with respect to a request from the LTE system entity and a recommended routing type/routing rule. Hereinafter, steps 1090 and 1095 are the same as those shown in FIG. 10.

In addition, in the present invention, a session suspend timer may be defined. At a time point at which the routing modify is successfully completed, the general device and the LTE system entity starts the session suspend timer. If there is no modification (e.g., re-switch) until the corresponding timer expires, a bearer/session mapped to an EPS bearer of a previous RAT is suspended according to a switch RAT.

Also, in the present invention, a session release timer may be defined. At a time point at which the routing modification is successfully completed or at a time point at which the session suspend timer is terminated, the general device and the LTE system entity starts the session release timer. If there is no modification until the corresponding timer expires, a bearer/session mapped to the EPS bearer of a previous RAT is released according to a switch RAT.

Meanwhile, in the present invention, when a switch RAT is WiFi in the routing rule, the following procedure may be performed. The LTE system entity (e.g., eNB) suspends (deactivates)/releases radio bearers mapped to all the EPS bearers related to U-plane. In this case, an existing radio bearer release procedure of the LTE system is used. Here, when the RRC_CONNECTED of the general device is intended to be maintained, RRC Connection Reconfiguration may be used. When the general device is intended to be transit to the RRC_IDLE, RRC Connection Release may be used. In this case, after receiving UE context release command, the eNB may transmit RRC connection release. In this case, release cause may be defined as U-plane switch.

Also, the LTE system entity (e.g., eNB, MME) suspends (deactivates)/releases E-RAB mapped to the corresponding EPS bearer. In this case, the existing release procedure of the LTE system is used. Here, when the RRC_CONNECTED of the general device is intended to be maintained, E-RAB RELEASE COMMAND/E-RAB Release INDICATION may be used. Also, when the general device is intended to be transit to the RRC_IDLE, UE context release request/UE context release command may be used. In this case, release access bearer request/release access bearer response may be used between the MME and the S-GW.

Meanwhile, when the switch RAT is cellular in the routing rule, the P-GW or the LTE system entity suspends (deactivates)/releases a WiFi session mapped to all the EPS bearers related to the U-plane.

Figure 13A:
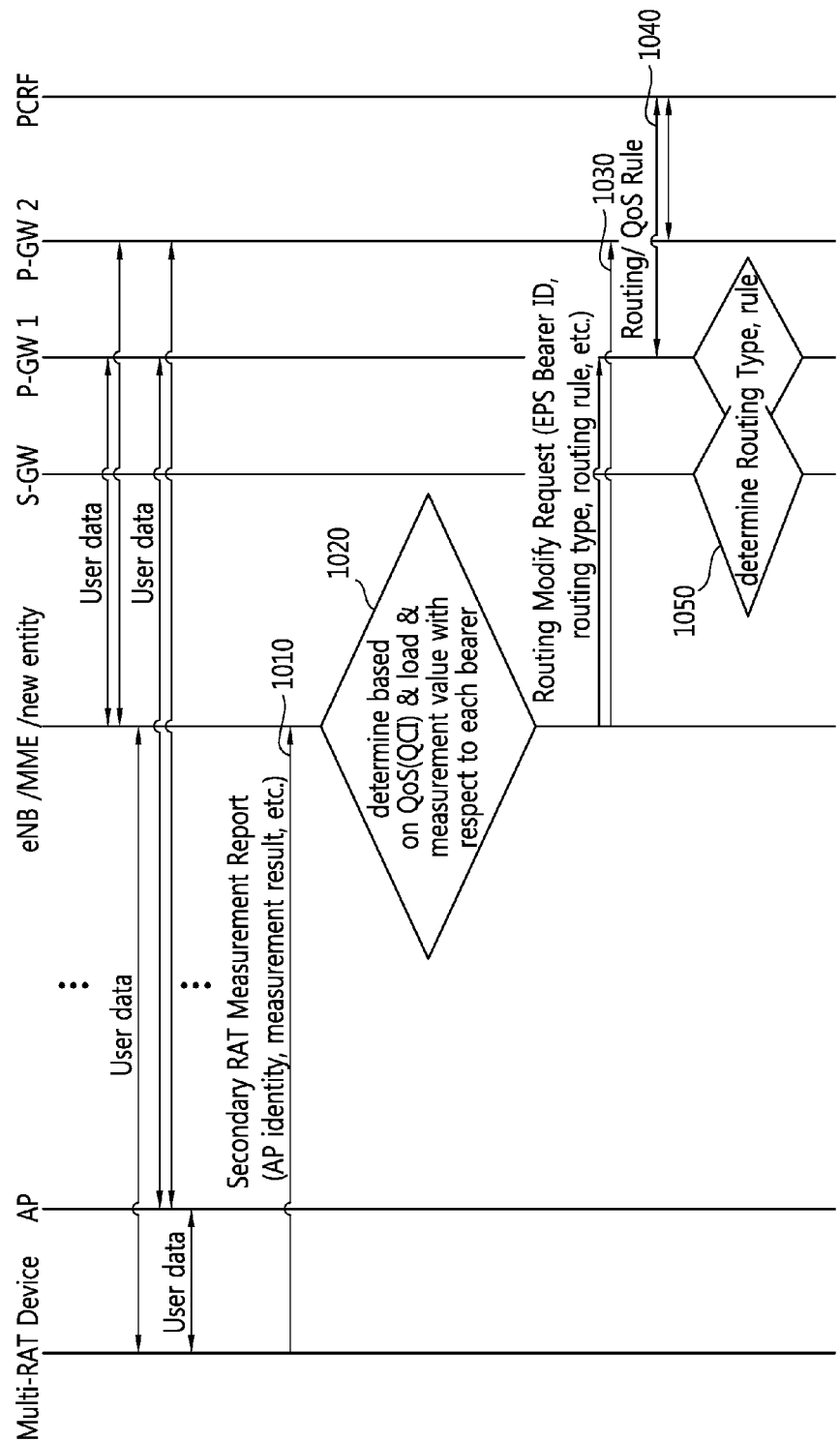
Figure 13B:
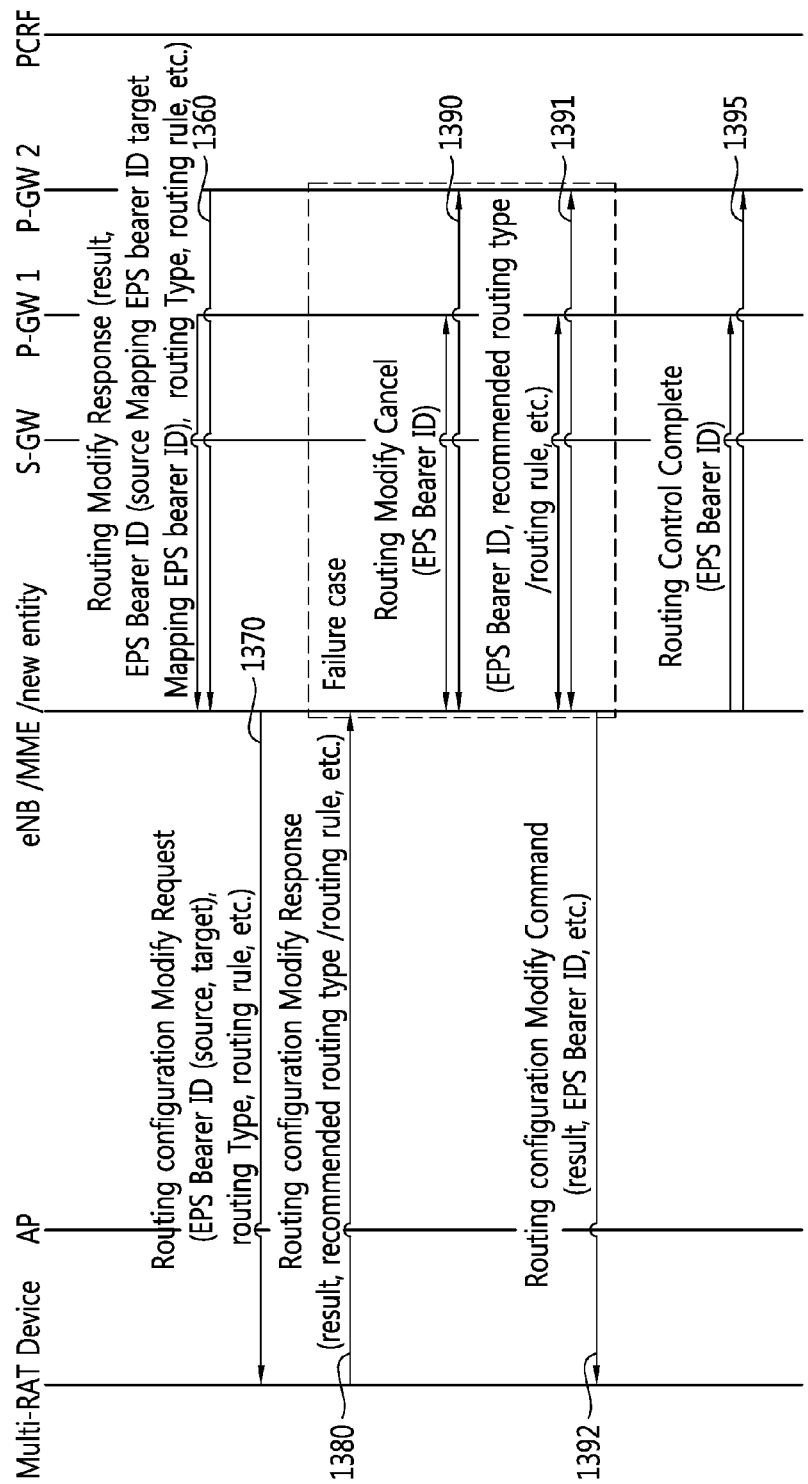

FIG. 13 shows a signaling flow in case 3 (U-plane segregation→U-plane aggregation) according to an embodiment of the present invention. Hereinafter, a portion of the procedure of FIG. 13 may be the same as that of FIG. 10, and information included in some steps may be different.

First, in a case in which a transmission RAT currently applied to a corresponding session is cellular, a routing information modify procedure is the same as the case 0 & 1. Meanwhile, in a case in which a transmission RAT currently applied to a corresponding session is WiFi, a routing information modify procedure is identical to case 3.

During a process of generating a PDN connection through a secondary RAT system, the P-GW may newly allocate resources for the corresponding PDN connection and set QoS, or may be mapped to an existing resource. Since the corresponding PDN connection is a user data path generated/transmitted through the secondary RAT system, rather than a primary RAT system, there is no need to perform all the procedures (e.g., resource allocation related to a radio bearer, resource allocation between eNB and S-GW, etc.). Thus, information indicating fact that the PDN connection is generated through the secondary RAT system needs to be transmitted to the S-GW/MME.

Here, resources for PDN connection and QoS parameters may include information such as EPS bearer ID (in create session request sent by MME, in create bearer response sent by MME), PDN connection ID, QCI, ARP, guaranteed bit rate (GBR), maximum bit rate (MBR), access point name aggregate maximum bit rate (APN-AMBR), UE-AMBR, etc.

In case of the PDN connection ID, a new identifier for the corresponding purpose may be defined, rather than utilizing an existing EPS bearer ID. In this case, a subject allocating the corresponding identifier may be the MME or the P-GW, and in the procedure related to session generation/change for (re)applying U-plane segregation, whether the identifier is an EPS bearer ID or whether it is an identifier of the corresponding purpose needs to be discriminated and informed to a recipient. Also, information (e.g., EPS bearer ID, PDN connection ID, QoS) regarding the corresponding PDN connection is transmitted to other cellular entities (e.g., eNB, MME, new entity), as well as to the general device. This may be limited to only a case in which resource is newly allocated.

Thus, each P-GW informs the LTE system entity about the result of step 1050. The LTE system entity receives a routing modify request message (1360). The routing modify request message includes a result which indicates a response (accept/reject) with respect to a request from the LTE system entity, EPS bearer ID, flow IDs whose routing information is to be modified, a routing type which indicates U-plane separation type to be modified with respect to each EPS bearer/flow (U-plane aggregation/segregation), a routing rule which indicates U-plane separation rule to be modified with respect to each EPS bearer/flow (in case of U-plane aggregation, transfer rate through each RAT system/in case of U-plane segregation, transmission RAT). The EPS bearer ID includes a source mapping EPS bearer ID for EPS bearer whose routing information is to be modified, and a target mapping EPS bearer ID for EPS bearer to be used for transmission and reception of user data belonging to a corresponding source mapping EPS bearer. In this case, when the target mapping EPS bearer ID is identical to the source mapping EPS bearer ID, the target mapping EPS bearer ID may be omitted.

In a case in which the result within the received routing modify message is 'accept' in step 1360, the LTE system entity temporarily stores information for simultaneous transmission modification of the general device (e.g., the P-GW to which simultaneous transmission is to be applied, etc.), and provides the simultaneous transmission modify information (1370). The routing configuration modify request message includes EPS bearer ID (source mapping EPS bearer ID, target mapping EPS bearer ID), Flow ID whose routing information is to be modified, a routing type which indicates U-plane separation type to be modified in each DRB/EPS bearer/flow, and a routing rule which indicates U-plane separation rule to be modified in each DRB/EPS bearer/flow. Here, the LTE system entity may additionally or in a substituted manner transmit other IDs (e.g., E-RAB ID, DRB ID, LCID) mapped to the corresponding EPS bearer ID. Thereafter, when the general device determines that the result is 'accept', the general device applies the modified routing information to UL data of a corresponding bearer/flow (1380). Thus, the general device may transmit a routing configuration modify response message including information regarding the routing modify request to the LTE system entity.

Meanwhile, when the result within the received message is 'accept', the LTE system entity informs the P-GW accordingly (1395). When the result is 'accept', the P-GW applies the modified routing information to DL data of the corresponding bearer/flow.

Here, when the source mapping EPS bearer ID and target mapping EPS bearer ID are different from each other, the P-GW release the source mapping EPS bearer ID. This is because, in the case in which user data belonging to the source mapping EPS bearer is intended to be transmitted and received by mapping it to an existing bearer in which data transmission and reception is already performed through a cellular network, the source mapping EPS bearer ID is not necessary any longer after the bearer mapping is normally completed.

Figure 14A:
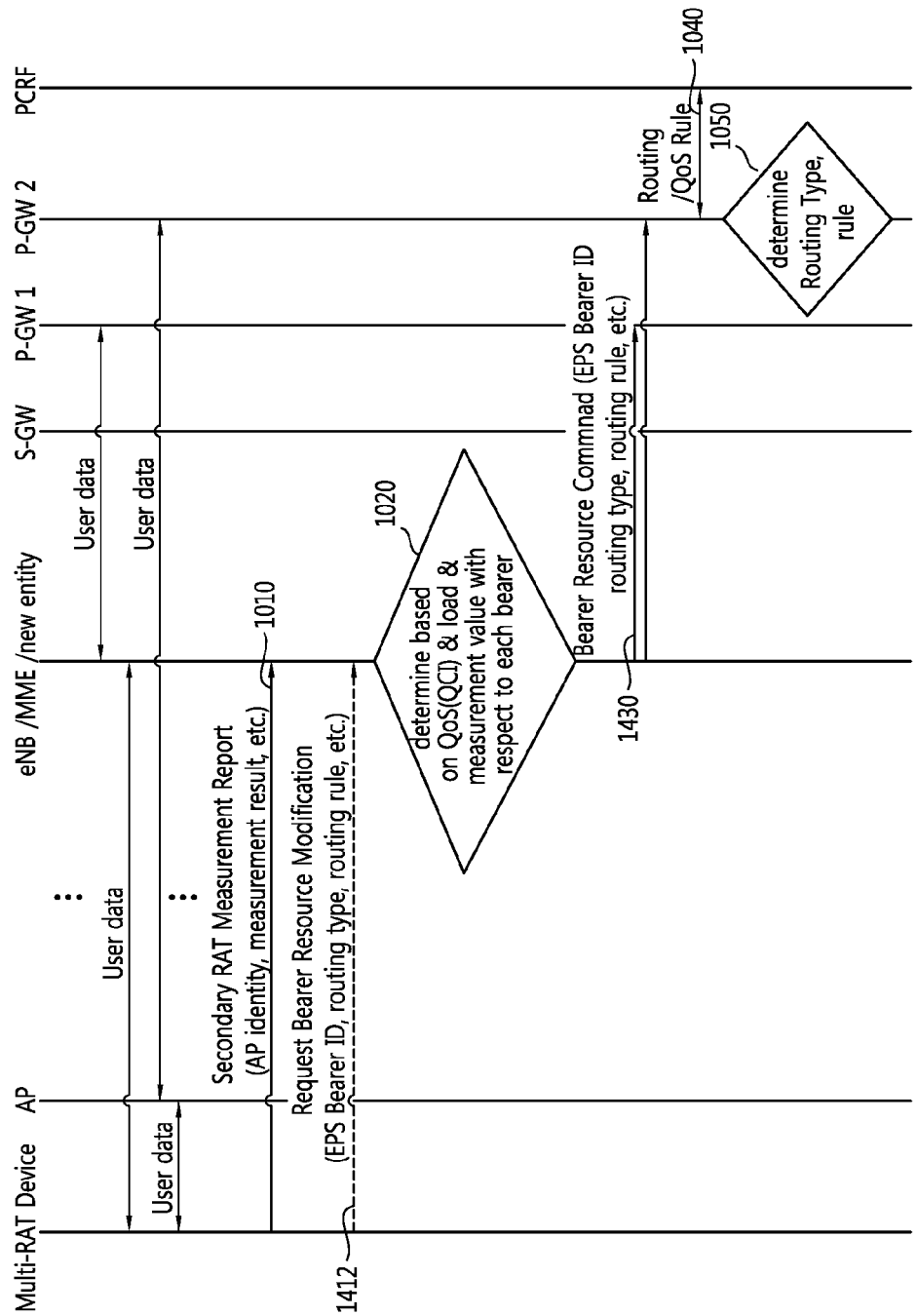
Figure 14B:
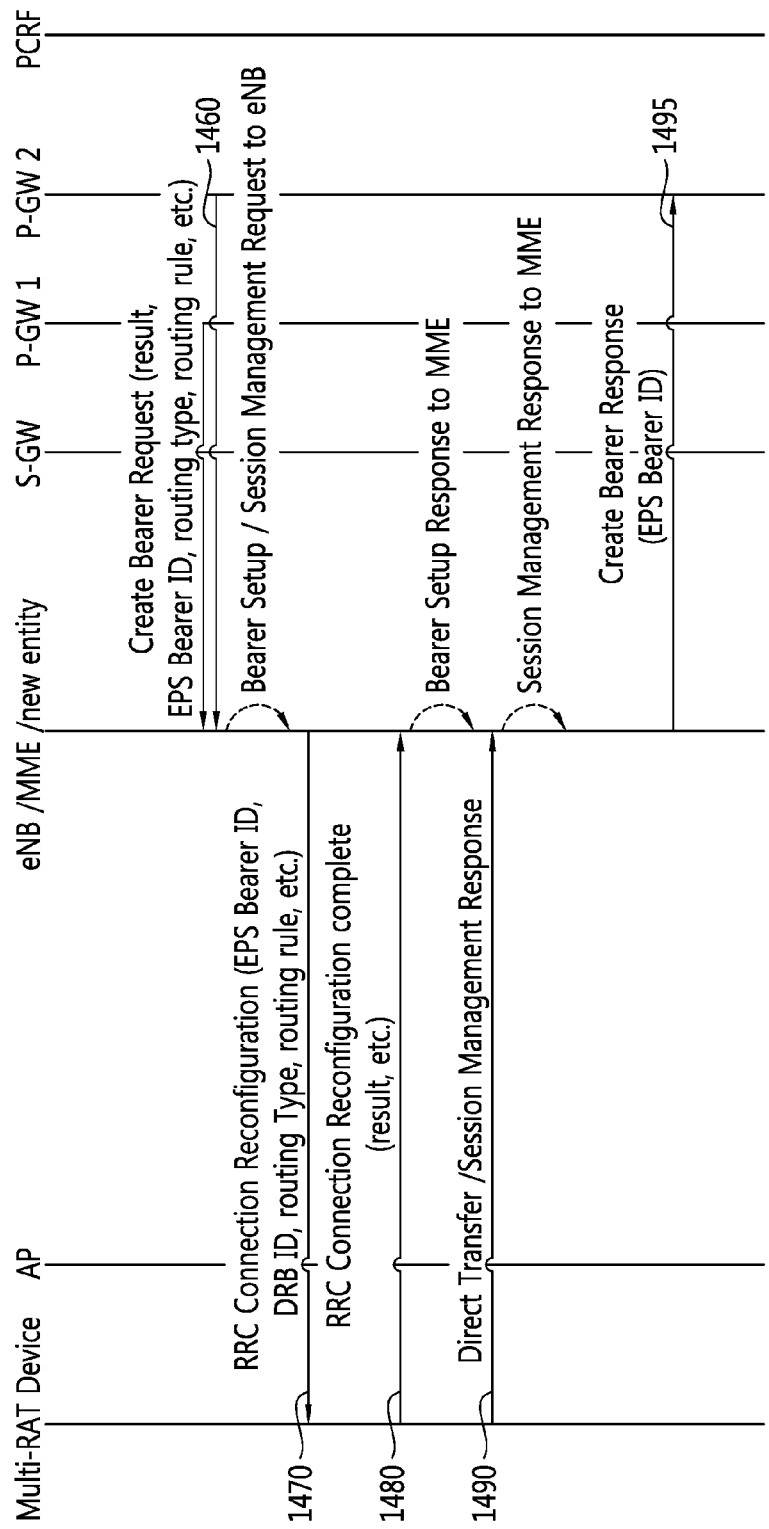

FIG. 13 shows a case in which a routing modify request is NW-initiated and a case of mapping to an existing bearer in which data transmission and reception is already performed through a cellular network. Meanwhile, FIG. 14 shows a case in which routing modify is requested according to NW initiation and a new bearer is generated and a case in which a dedicated bearer is established according to an embodiment of the present invention. Hereinafter, the same numbered steps in FIG. 14 are identical to the steps described above with reference to FIGS. 10 to 13, and only some steps including different information are described.

Referring to FIG. 14, step 1412 is included only in a case in which when a transmission RAT currently applied to a corresponding session is WiFi, and a UE intends to modify routing information (e.g., U-plane segregation→U-plane aggregation, U-plane segregation transmission RAT=cellular). It may also be defined as UE initiated routing change. It is assumed that the UE, a general device, requests generation of a dedicated bearer as a bearer to be used in a cellular network. When the UE requests generation of a default bearer as a bearer to be used in the cellular network, a PDN CONNECTIVITY REQUEST message is used. Thus, a PDN CONNECTIVITY REQUEST and ACTIVATE DEFAULT EPS BEARER CONTEXT REQUEST are used between the UE and the MEE, and a create session request, create session response may be used between the MME and the GW.

Thus, the LTE system entity transmits a dedicated bearer generation request including the following information to P-GW(s) corresponding to the PDN(s) determined in step 1020 (1430). In this case, although there is no message reception in step 1412, the LTE system entity may transmit the corresponding request to the P-GW(s). Define this as NW initiated routing change 1. In this case, the request message may include EPS bearer IDs for modifying routing information, flow IDs for modifying routing information, routing type with respect to each EPS bearer/flow (U-plane aggregation/segregation), routing rule with respect to each EPS bearer/flow (transmission ratio, transmission RAT=cellular or WiFi). In this case, by including all the routing rules with respect to each routing type, the message may be utilized as information for the P-GW to finally determine a single routing type and rule.

After performing determination on the routing type/rule, each P-GW transmits a dedicated bearer generation request including the result to the MME (1460). In this case, even without the dedicated bearer generation request from the LTE system entity, each P-GW may transmit the corresponding request. Define this as NW initiated routing change 2.

The dedicated bearer generation request may include a result which indicates response (accept/reject) with respect to a request from the LTE system entity, EPS bearer ID for EPS bearer for modifying routing information, flow ID for flow for modifying routing information, a routing type which indicates simultaneous transmission type to be modified in each EPS bearer/flow (U-plane aggregation/segregation), a routing rule which indicates simultaneous transmission rule to be modified in each EPS bearer/flow (in case of U-plane aggregation, transfer rate through each RAT system/ in case of U-plane segregation, transmission RAT), etc. As for the flow ID, the UE and the P-GW in the 3GPP system share traffic flow description information (e.g., source and destination IP address and port numbers and the protocol information) as traffic flow template within protocol configuration options. Also, in a case in which routing information of only a particular flow is determined to be modified, the P-GW transmits traffic flow description information to be modified, thereby informing the UE about which flow within a corresponding EPS bearer is modified. Upon receiving the corresponding request, the MME generates E-RAB for the corresponding dedicated bearer between the eNB and the S-GW.

When the result within the bearer configuration request message is 'accept', the LTE system entity temporarily stores information for simultaneous transmission modification of the general device (e.g., P-GW to which simultaneous transmission is to be applied, etc.), and provides the simultaneous transmission modification (1470).

During the process, the eNB and the UE generate a radio bearer for the corresponding dedicate EPS bearer. It includes the EPS bearer ID for EPS bearer for modifying routing information, flow ID for flow for modifying routing information, a routing type which indicates simultaneous transmission type to be modified in each DRB/EPS bearer/flow, a routing rule which indicates simultaneous transmission rule to be modified in each DRB/EPS bearer/flow (in case of U-plane aggregation, transfer rate through each RAT system/ in case of U-plane segregation, transmission RAT), etc. Here, with respect to the EPS bearer ID, the LTE system entity may additionally or in a substituted manner transmit other IDs (e.g., E-RAB ID, DRB ID, LCID) mapped to the corresponding EPS bearer ID. This may be performed through an RRC connection reconfiguration message.

When the result is 'accept', the general device applies the modified routing information to UL data of the corresponding bearer/flow (1080). By transmitting the RRC connection reconfiguration complete message, information about the application completion is provided.

Also, the general device transmits results of performing steps 1470 and 1480 to the LTE system entity (e.g., MME). In this case, the general device requests a session management from the MME through a direct transfer/session management response message. In this case, in response to the session management, the LTE system entity transmits a response message including the corresponding EPS bearer ID to the corresponding P-GW(s) in step 1490. Namely, when the result within the received in step 1480 is 'accept', the LTE system entity informs the P-GW accordingly. In this case, the transmitted EPS bearer ID includes an identifier (=source EPS bearer) of a bearer for modifying routing information and an identifier (=target EPS bearer) of a bearer which has been newly generated to be used in the cellular network. The target EPS bearer ID is an identifier allocated by the LTE system entity (e.g., MME). The P-GW applies the modified routing information to DL data of the corresponding bearer/flow.

Figure 15A:
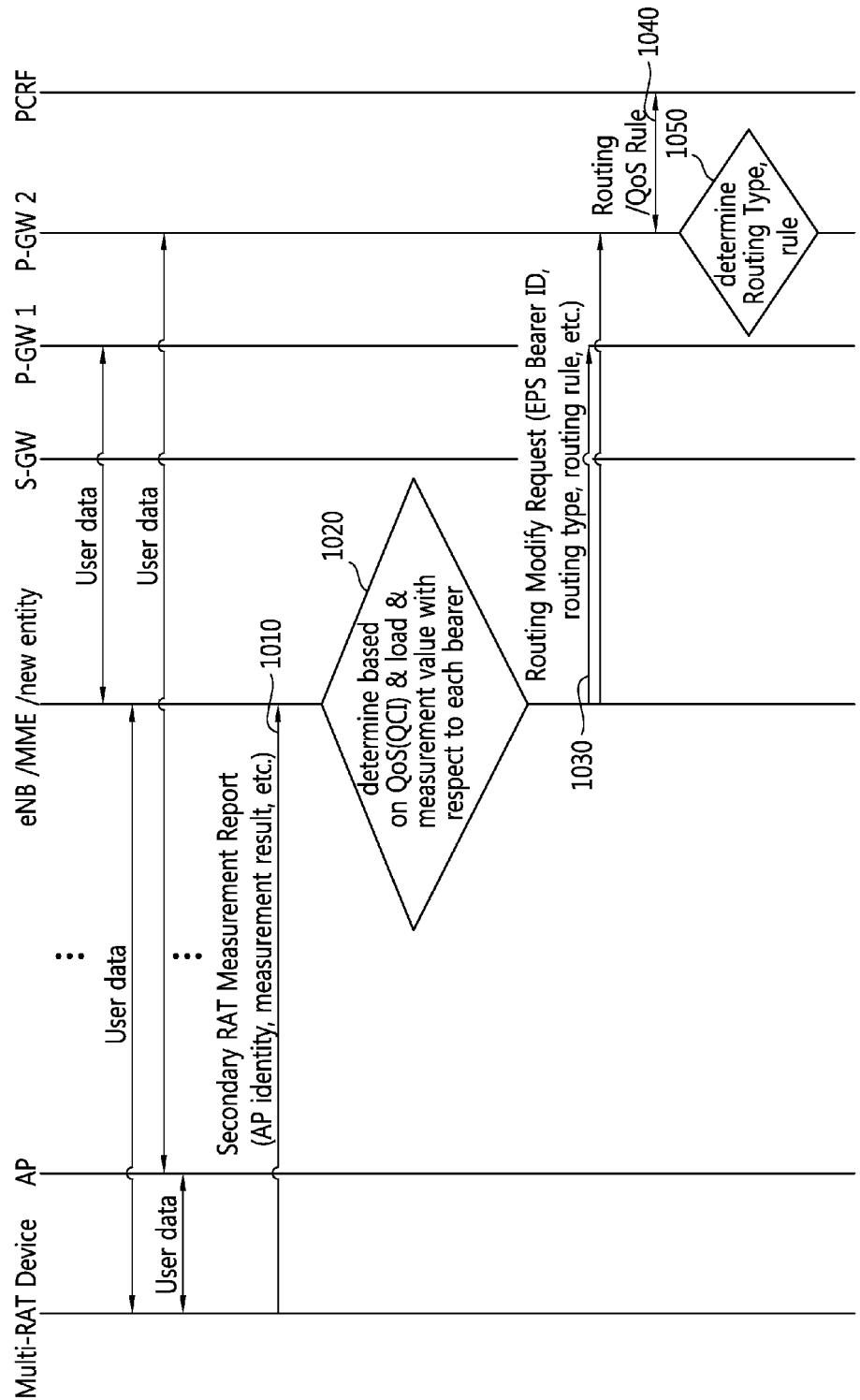
Figure 15B:
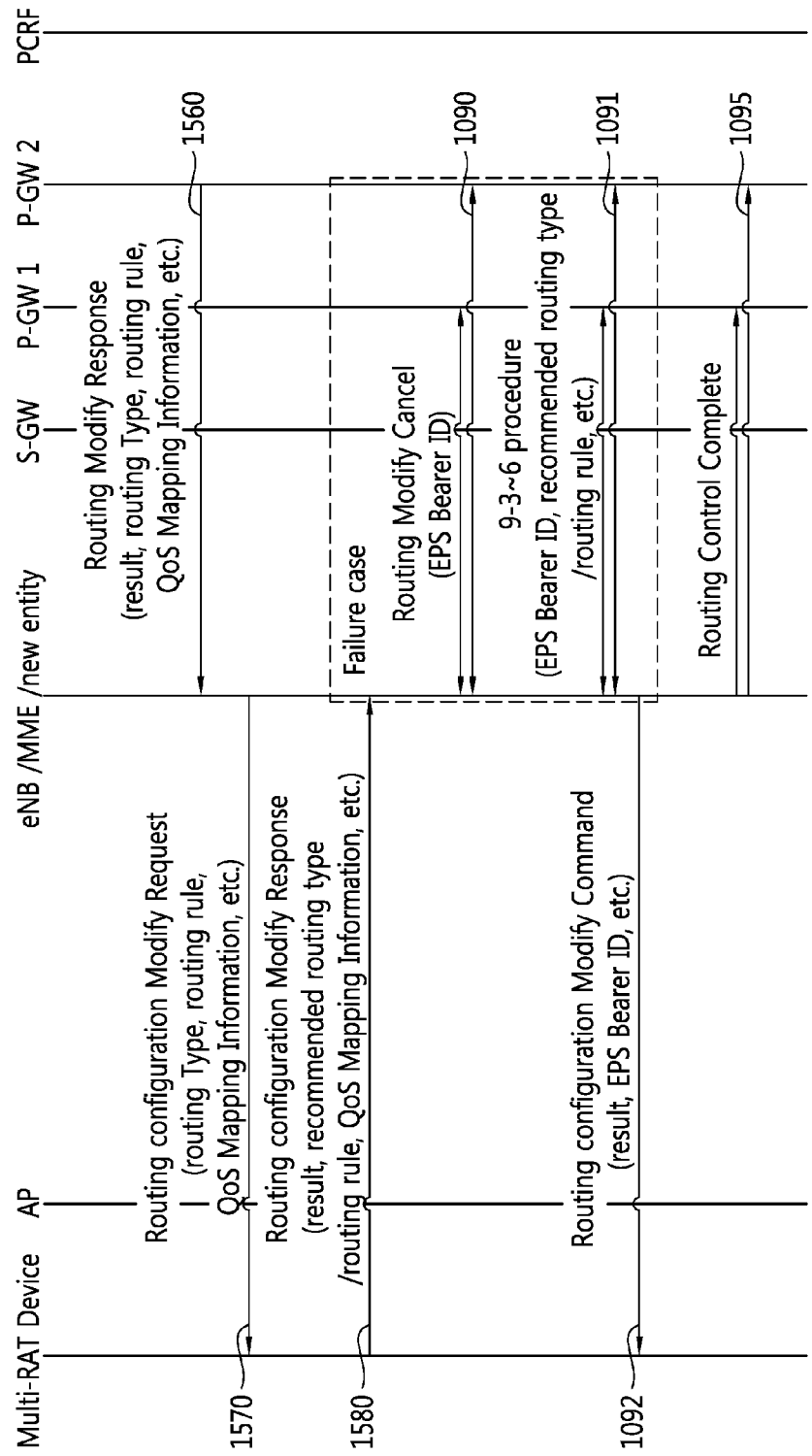

FIG. 15 shows a signaling flow in case 4 (U-plane segregation→U-plane switch) according to an embodiment of the present invention. Hereinafter, steps numbered to be identical to those of FIG. 10 are the same as the steps described above with reference to FIGS. 10 to 14, and only some steps including different information are described.

First, in a case in which a switch RAT is WiFi, a routing information modify procedure is the same as case 2.

Meanwhile, in a case in which a switch RAT is cellular, a routing information modify procedure is the same as case 4. In this case, during a process of generating a PDN connection through a secondary RAT system, a P-GW newly allocates resources for corresponding PDN connection and sets QoS, or maps it to the existing resource. This is because, since the corresponding PDN connection is a user data path generated/transmitted through the secondary RAT system, rather than the primary RAT system, there is no need to perform all the procedures (e.g., resource allocation related to a radio bearer, resource allocation between eNB and S-GW, etc.). Thus, information indicating fact that the PDN connection is generated through the secondary RAT system needs to be transmitted to the S-GW/MME.

In this case, resource for the PDN connection and QoS parameters include EPS bearer ID (in create session request sent by MME, in create bearer response sent by MME), QCI, ARP, GBR, MBR, APN-AMBR, UE-AMBR, etc. Information regarding the corresponding PDN connection is transmitted to other cellular entities (e.g., eNB, new entity), as well as to the general device. This may be limited only to a case in which resource is newly allocated.

Referring to FIG. 15, each P-GW informs the LTE system entity about the result in step 1560. In this case, a routing modify response message may include a result which indicates a response (accept/reject) with respect to a request from the LTE system entity, a routing type which indicates U-plane separation type to be modified (=U-plane switch), a routing rule which indicates U-plane separation rule to be modified (switch RAT), QoS mapping information, etc.

Here, the QoS mapping information may include, when mapped to an existing bearer in which data transmission and reception is already performed through the cellular network, a source mapping EPS bearer ID for EPS bearer for modifying routing information and a target mapping EPS bearer ID for EPS bearer to be used for transmitting and receiving user data belonging to a corresponding the source mapping EPS bearer when routed to the cellular network, and in this case, when the target mapping EPS bearer ID is identical to the source mapping EPS bearer ID, the target mapping EPS bearer ID may be omitted. The QoS mapping information may include, when mapped to a newly generated default/dedicated bearer, the source mapping EPS bearer ID for EPS bearer for modifying routing information, and action code for generation of default/dedicated bearer, and the P-GW transmits a request for performing according to Action code to the MME.

In this case, the P-GW may not transmit DL data to a previous RAT.

Figure 16:
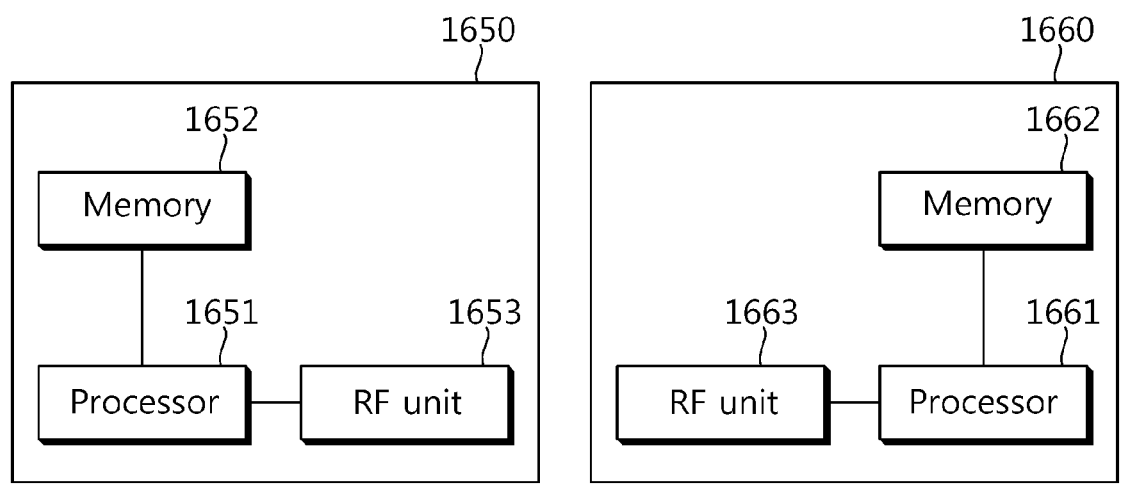
FIG. 16 is a block diagram showing a wireless communication system according to an embodiment of the present invention.

FIG. 16 is a block diagram showing a wireless communication system according to an embodiment of the present invention.

A network entity (including BS, MME, GW) 1650 includes a processor 1651, a memory 1652, and a radio frequency (RF) unit 1653. The memory 1652 is coupled to the processor 1651, and stores a variety of information for driving the processor 1651. The RF unit 1653 is coupled to the processor 1651, and transmits and/or receives a radio signal. The processor 1651 implements the proposed functions, procedures, and/or methods. In the embodiments of FIG. 2 to FIG. 15, the operation of the network entity can be implemented by the processor 1651.

Especially, the processor 1651 may configure one or more cells with different frequencies or systems including Cellular/Wi-Fi, for this invention the processor 1651 may configures U-plane configuration having a WLAN triggering condition, a measurement configuration, and/or radio bearer configuration with the Wi-Fi system as the secondary system.

The processor 1651 may configure information on routing modification, the information on routing modification includes information on bearer ID including an EPS bearer ID, an E-RAB ID, a DRB ID, an LCID, a data flow ID, information on a routing type to be applied to a corresponding bearer and data flow, wherein the routing type includes at least one a U-plane aggregation, a U-plane segregation and a U-plane switch.

The information on the routing modification is changeable and varied by at least one of a network preference including a primary RAT system or the secondary RAT system, a quality of service (QoS) information, and bearer information. Also the threshold can be defined based on data amount, data characteristic (type), or data QoS.

The routing type includes a routing type transition. The routing type transition includes a case, which is from a U-plane aggregation to U-plane aggregation, from a U-plane aggregation to U-plane segregation, from a U-plane aggregation to a U-plane switch, from a U-plane segregation to a U-plane aggregation or a U-plane segregation, or from a U-plane segregation to a U-plane switch.

Also the information on a routing rule includes that a ratio of transmission for a corresponding bearer and data flow is applied to the primary RAT system and secondary RAT system, wherein the routing rule includes an indication of a transmission RAT system. The primary RAT system is a 3GPP LTE system, and wherein the secondary RAT system is IEEE 802.11 system.

The processor 1651 may configure the information and control data transition direction between the primary RAT system and the secondary RAT system, it uses network preference information of UE including an available AP, a preferred AP, or a private AP, wherein the priority is determined by a load and a service set of the APs each. The processor 1651 may configure the information, the information further includes a configuration including whether a condition is setup, modified or released of the data bearer for the UE.

Thus the processor 1651 may have a signal procedure having the configured the information with UE, the processor 1651 control to transmit and receive the information on routing modification and information on the handover according to the information, it includes RRC message including a measurement configuration/report, a radio resource bearer configuration/complete, a handover procedure messages with UE.

The wireless device 1660 includes a processor 1661, a memory 1662, and an RF unit 1663. The memory 1662 is coupled to the processor 1661, and stores a variety of information for driving the processor 1661. The RF unit 1663 is coupled to the processor 1661, and transmits and/or receives a radio signal. The processor 1661 implements the proposed functions, procedures, and/or methods. In the embodiments of the FIG. 2 to FIG. 13, the operation of the UE can be implemented by the processor 1661.

Especially, the processor 1661 may configure one or more cells with different frequencies or systems including Cellular/Wi-Fi, for this invention the processor 1651 may configures U-plane configuration having a WLAN triggering condition, a measurement configuration, and/or radio bearer configuration with the Wi-Fi system as the secondary system. The processor 1661 may check an configure information on routing modification, the information on routing modification includes information on bearer ID including an EPS bearer ID, an E-RAB ID, a DRB ID, an LCID, a data flow ID, information on a routing type to be applied to a corresponding bearer and data flow, wherein the routing type includes at least one a U-plane aggregation, a U-plane segregation and a U-plane switch.

The processor 1661 may check that the information on the routing modification is changeable and varied by at least one of a network preference including a primary RAT system or the secondary RAT system, a quality of service (QoS) information, and bearer information. Also the threshold can be defined based on data amount, data characteristic (type), or data QoS. For this the UE can send the QoS measurement result, and UE preference network information to the network entity. The information on the routing modification includes a routing type, it includes a routing type transition, the routing type transition includes a case, which is from a U-plane aggregation to U-plane aggregation, from a U-plane aggregation to U-plane segregation, from a U-plane aggregation to a U-plane switch, from a U-plane segregation to a U-plane aggregation or a U-plane segregation, or from a U-plane segregation to a U-plane switch. Also the information on a routing rule includes that a ratio of transmission for a corresponding bearer and data flow is applied to the primary RAT system and secondary RAT system, wherein the routing rule includes an indication of a transmission RAT system. So the UE can supports that the primary RAT system is a 3GPP LTE system, and wherein the secondary RAT system is IEEE 802.11 system.

The processor 1661 may configure the information and control data transition direction between the primary RAT system and the secondary RAT system, it may send a recommended information including a bearer ID, data flow ID, a routing type, and a routing rule for the data transmission. It includes network preference information of UE including an available AP, a preferred AP, or a private AP, wherein the priority is determined by a load and a service set of the APs each. The processor 1661 may configure the information, the information further includes a configuration including whether a condition is setup, modified or released of the data bearer for the UE.

Thus the processor 1661 may have a signal procedure having the configured the information with UE, the processor 1661 control to transmit and receive the information on routing modification and information on the handover according to the information, it includes RRC message including a measurement configuration/report, a radio resource bearer configuration/complete, a handover procedure messages with the network entity.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing, by a user equipment (UE), routing modification in a wireless communication system, the method comprising:

receiving information on routing modification from a network entity of a primary radio access technology (RAT) system; and performing the routing modification between the primary RAT system and a secondary RAT system according to the information on routing modification, wherein the secondary RAT system is used for user plane (U-plane) data, wherein the primary RAT system is a 3rd Generation Partnership Project (3GPP) Long-Term Evolution (LTE) system, wherein the secondary RAT system is an Institute of Electrical and Electronics Engineers (IEEE) 802.11 system, and wherein the information on routing modification further includes information on bearer identity (ID) including an evolved packet system (EPS) bearer ID and a data radio bearer (DRB) ID, and a logical channel ID (LCID).

2. The method of claim 1, wherein the information on routing modification further includes information on a routing type to be applied to a corresponding bearer and data flow, and wherein the routing type includes at least one a U-plane aggregation, a U-plane segregation and a U-plane switch.

3. The method of claim 2, wherein the information on routing modification is changed adaptively according to a routing type transition, and wherein the routing type transition includes a case, which is from a U-plane aggregation to U-plane aggregation, from a U-plane aggregation to U-plane segregation, from a U-plane aggregation to a U-plane switch, from a U-plane segregation to a U-plane aggregation or a U-plane segregation, or from a U-plane segregation to a U-plane switch.

4. The method of claim 1, wherein the information on routing modification further includes information on a routing rule including that a ratio of transmission for a corresponding bearer and data flow is applied to the primary RAT system and secondary RAT system, wherein the routing rule includes an indication of a transmission RAT system.

5. The method of claim 1 further comprising:

transmitting a response message, in response to the information on routing modification, to the network entity of the primary RAT system.

6. The method of claim 5, wherein the response message further includes recommended information including a bearer ID, a data flow ID, a routing type, and a routing rule.

7. The method of claim 1 further comprising:

starting a session suspend timer after performing the routing modification, and starting a session release timer after performing the routing modification or after the session suspend timer expires.

8. The method of claim 1 further comprising:

transmitting measurement results configured for the secondary RAT system, wherein the measurement results further include information including a priority of access points (APs) of the secondary RAT system, and preference information including an available AP, a preferred AP, or a private AP.

9. A wireless device in a wireless communication system, the wireless device comprises:

a radio frequency (RF) unit; and a processor, coupled to the RF unit, that:

receives information on routing modification from a network entity of a primary radio access technology (RAT) system; and perform the routing modification between the primary RAT system and a secondary RAT system according to the information on routing modification, wherein the secondary RAT system is used for a user plane (U-plane) data, wherein the primary RAT system is a 3rd Generation Partnership Project (3GPP) Long-Term Evolution (LTE) system, wherein the secondary RAT system is an Institute of Electrical and Electronics Engineers (IEEE) 802.11 system, and wherein the information on routing modification further includes information on bearer identity (ID) including an evolved packet system (EPS) bearer ID and a data radio bearer (DRB) ID, and a logical channel ID (LCID).

* * * * *